(12) United States Patent
Däschlein-Gessner et al.

(10) Patent No.: US 12,521,704 B2
(45) Date of Patent: Jan. 13, 2026

(54) YLIDE-FUNCTIONALISED PHOSPHANES FOR USE IN METAL COMPLEXES AND HOMOGENEOUS CATALYSIS

(71) Applicant: Umicore AG & Co. KG, Hanau-Wolfgang (DE)

(72) Inventors: Viktoria Däschlein-Gessner, Bochum (DE); Thorsten Scherpf, Bochum (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 18/545,062

(22) Filed: Dec. 19, 2023

(65) Prior Publication Data

US 2024/0149256 A1    May 9, 2024

Related U.S. Application Data

(62) Division of application No. 17/152,365, filed on Jan. 19, 2021, now abandoned, which is a division of application No. 16/636,962, filed as application No. PCT/EP2018/071550 on Aug. 8, 2018, now Pat. No. 10,940,470.

(30) Foreign Application Priority Data

Aug. 8, 2017  (DE) .......................... 102017213817.3

(51) Int. Cl.
    *B01J 31/24*    (2006.01)
(52) U.S. Cl.
    CPC .......... *B01J 31/24* (2013.01); *B01J 2231/321* (2013.01); *B01J 2231/4211* (2013.01); *B01J 2231/4283* (2013.01); *B01J 2531/0205* (2013.01); *B01J 2531/18* (2013.01); *B01J 2531/824* (2013.01); *B01J 2540/34* (2013.01); *B01J 2540/54* (2013.01)

(58) Field of Classification Search
    None
    See application file for complete search history.

(56) References Cited

U.S. PATENT DOCUMENTS

| 2,998,416 | A  | 8/1961  | Mendel          |
| 6,307,087 | B1 | 10/2001 | Buchwald et al. |
| 7,148,176 | B2 | 12/2006 | Beller et al.   |
| 2004/0068131 | A1 | 4/2004 | Beller et al.   |

FOREIGN PATENT DOCUMENTS

| CN | 101023092 A   | 8/2007 |
| DE | 10037961 A1   | 2/2002 |
| JP | 2004-505091 A | 2/2004 |
| TW | 201542293 A   | 11/2015 |
| WO | 02/10178 A1   | 2/2002 |

OTHER PUBLICATIONS

Aggarwal, V.K., et al., "Thiocarboxylic acids and derivatives, alpha-substituted sulfur ylides", Chemical Abstract Plus (CAPLUS), Database Accession No. 2005:951681, retrieved from CAS online, XP-002786463.
Benn, R., et al., "Reactions of Vinylphosphiranes with Methylenetrimethylphosphorane", Tetrahedron, vol. 40, No. 17, (1984), pp. 3273-3276.
Boldeskul, I. E. et al. "Stabilization and spectral properties of sulfoxonium ylides" 1980, retrieved from the STN, abstract No. Database accession No. 1980: 118831, Retrieved from: CA [ online] Chemical Abstracts Service, Columbus, Ohio, US XP002786461.
Boldeskul, I. E. et al; Teoreticheskaya i Eksperimental'naya Khimiya, vol. 15, No. 6, 1979, pp. 727-731.
Braun et al., "Preferred Yiide Formation Upon Alkylation of Lithiobis (diphenylephosphanyle) acetonitrile," European Journal of Inorganic Chemistry, vol. 19, 2007, pp. 3083-3090.
Frederik Piestert et al., Easy one-pot synthesis of new dppm-type linkers for immobilizations, Chem. Commun, vol. 11, 2005, pp. 1481-1483.
International Preliminary Report on Patentability for PCT/EP2018/071550 mailed Nov. 23, 2018.
Issleib et al. (Justus Liebigs Annalen derChemie, 699(1), 1966, 40-52 (Year: 1966).
Jochem et al., "Bis(triphenylphosphoniumylidyl)phosphane," A Journal of Chemical Sciences, vol. 51, No. 2, 1996, pp. 267-276.
Knoll Lothax: "Reaktionen von Pkospliorylidеn mit Uibergangsmetall-Yerbindungen, V [I] I-Dipheiiylphоsplimyl-Alkylidciitriplienylpliosphoran-carbonyl-chrom-und-oisen-Komplexe", Jan. 1, 1978, pp. 396-398.
Kolodyazhnyi, O.I., "Reactions of sulfoxonium ylides with magnesium halides", Chemical Abstracts Plus (CAPLUS), Database Accession No. 1975: 169936, retrieved from CAS online, XP-00278644.
Langer, J., et al., "Dppm-derived phosphonium salts and ylides as ligand precursors for s-block organometallics", ARKIVOC, vol. 2012, No. 3, (2011), pp. 210-225.
Langrick et al., "Bimetallic Systems. Part 2. Synthesis and Interconversion of Monodentate- and Bridging-bis(diphenylphosphino)methane Platinum, Diplatinum, and Mercury-Platinum Acetylides," Journal of the Chemical Society, vol. 11, 1983, pp. 2487-2493.
Lothar et al., Transition metal complexes of unstable ylides, V. Novel double ylides of phosphorus as chelating ligands in chromium complexes, Chemische Berichte, vol. 118, 1985, pp. 541-550.
Lysenko, V. P. et al; Zhurnal Obshchei Khimii, vol. 49, No. 6, 1979, pp. 1230-1235.
Lysenko, V.P., et al., "Phosphorus-containing sulfoxonium ylides. IV. Ylides containing substituents with trivalent phosphorus", Chemical Abstracts Plus (CAPLUS), Database Accession No. 1979-523806, retrieved from CAS online, XP-002786465.
Mastryukova et al., Triad thiophosphoryl-mercaptoylide tautomerism ,Zhurnal Obshchei Khimii, vol. 54, 1984, pp. 36-41.
Merceron-Saffon, M. et al; Science, vol. 301, No. 5637, 2003, pp. 1223-1225.
Organ, M., et al., "Pd-NHC (PEPSI) Complexes: Synthetic Utility and Computational Studies into Their Reactivty", Synthesis, vol. 2008, No. 17, (2008), pp. 2776-2797.

(Continued)

*Primary Examiner* — Yun Qian
(74) *Attorney, Agent, or Firm* — Faegre Drinker Biddle & Reath LLP

(57) ABSTRACT

The invention relates to ylide-functionalized phosphane ligands, the production of same and use in transition metal compounds, as well as the use of same as catalysts in organic reactions.

17 Claims, No Drawings

(56) References Cited

OTHER PUBLICATIONS

Pascual, S., et al., "Synthesis of a Mixed Phosphonium-Sulphonium Bisylides R3P=C=SR2", Angewandte Chemie International Edition, vol. 46, No. 47, (2007), pp. 9078-9080.

Pascual, S., et al., "Synthesis of a Mixed Phosphonium-Sulfonium Bisylide R3P=C=SR2", Angew. Chem., vol. 119, 2007, pp. 9236-9238.

Rafael, et al., Synthesis of benzyl-or (pentafluorobenzyl)diphenylphosphonio(diphenylphos phino)methanide complexes of gold(I) and gold(III) and their use as carbon-donor ligands, Journal of the Chemical Society, Dalton Transactions: Inorganic Chemistry, vol. 1, 1988, pp. 155-158.

Scherpf et al., "Ylide-Functionalized Phosphines: Strong Donor Ligands for Homogeneous Catalysis", Angewandte Chemie International Edition, vol. 57, No. 39, Sep. 24, 2018, pp. 12859-12864.

Schmidbaur et al., "Schwache intramolekulare Bindungsbeziehungen: Die konformationsbestimmende attraktive Wechselwirkung zwischen Gold(J)-Zentren", Angewandte Chemie, vol. 100, No. 3, 1988, pp. 439-441.

Schmidbaur et al., "Synthese und Struktur zweier Gold-Komplexe des Triphenylphosphonium-[bis(diphenylphosphino)methylids]", Helvetica Chimica Acta, vol. 69, No. 7, Oct. 29, 1986, pp. 1748-1756.

Schmidbaur et al., "Synthesen unsymmetrischer Methyle/Phenylecarbodiphasphorane," Chemische Berichte, vol. 117, No. 12, 1984, pp. 3374-3380.

Schmidbaur et al., Angewandte Chemie, vol. 91, No. 10, 1979, pp. 848-850.

Schmidbaur et al., Synthesis and Structure of Some New Organophosphorus Ligands and Their Metal Complexex, Pure and Applied Chemistry, vol. 52, pp. 1057-1062. 1980.

Schmidbaur, H. et al; Chemische Berichte, 1979, vol. 112, No. 2, pp. 1979, 510-516.

Schmidbaur, H., "Synthesis and Structure of Some New Organophorus Ligands and Their Metal Complexes", Chemical Abstracts Plus (CAPLUS), Database Accession No. 1980:568385, retrieved from CAS online, XP-002786459.

Schmidbaur, Hubert et al. "Chemistry of the H3B(CH3)2 group. 2. Synthesis and crystal structure of a salt with the anion [H3B(CH3)2PCHP(CH3)2BH3]-; preliminary stages and related compounds" 1980, retrieved from the STN, abstract No. Database accession No. 1980:76578, Retrieved from: CA [ online] Chemical Abstracts Service, Columbus, Ohio, US XP002786460.

Schmidbaur, Hubert et al. "Organometalloid-substituted alkylidenephosphoranes" 1968, retrieved from the STN, abstract No. Database accession No. 1968:506810, Retrieved from: CA [ online] Chemical Abstracts Service, Columbus, Ohio, US XP002786458.

Schmidbaur, Hubert et al. "Preparation of unsymmetrical methyl/phenylcarbodiphosphoranes by synthesis or rearrangement" 1985, retrieved from the STN, abstract No. Database accession No. 1985:62339, Retrieved from: CA [ online] Chemical Abstracts Service, Columbus, Ohio, US XP002786462.

Yogendra et al., "Donor-acceptor interactions in tri(phosphonio)methanide dications [(Ph 3 P) 2 CP(X)Ph 2 ] 2+ (X=H, Me, CN, NCS, OH, CI, OTf, F)", Dalton Transactions, vol. 46, No. 44, Jan. 1, 2017, pp. 15503-15511.

Zhurnal Obshchei Khimii , vol. 45, No. 3, 1975, pp. 704-705.

YLIDE-FUNCTIONALISED PHOSPHANES FOR USE IN METAL COMPLEXES AND HOMOGENEOUS CATALYSIS

CROSS-REFERENCE TO RELATED APPLICATIONS

This application is a division of U.S. application Ser. No. 17/152,365, filed Jan. 19, 2021, which is a division of U.S. application Ser. No. 16/636,962, filed Feb. 6, 2020, which is a national stage application (under 35 U.S.C. § 371) of PCT/EP2018/071550, filed Aug. 8, 2018, which claims benefit of German Application No. 102017213817.3, filed Aug. 8, 2017, all of which are incorporated herein by reference in their entirety.

The invention relates to ylide-functionalized phosphane ligands, the preparation thereof, and the use thereof in transition metal compounds, and the use thereof as catalysts in organic reactions.

BACKGROUND OF THE INVENTION

The synthesis of complex molecules if often a central task in the fine chemicals industry, for example, in order to prepare products for the production of pharmaceuticals, dyes, agrochemicals, materials, etc. Catalytic processes for functionalization reactions are frequently required therein, such as coupling reactions (Suzuki, Heck, Sonogashira etc.) or hydrofunctionalizations (hydroamination, hydrosilylation, etc.) for the derivatization of olefins, aryls, or alkynes. Such catalyses are critically influenced by the metal and the ligands employed.

Phosphanes are among the most frequently used ligands in catalysis. Adjusting their electronic and steric parameters is critical to increase the activity of a catalyst, to determine selectivities, and to be able to enlarge the substrate diversity (A. C. Hillier et al., Organometallics, 22: 4322 (2003); H. Clavier et al. Chem. Commun., 46: 841 (2010); Z. L. Niemeyer, A. Milo, D. P. Hickey, M. S. Sigman, Nature Chem. 8: 610 (2016); C. A. Tolman, Chem. Rev. 77, 313 (1977); G. Frenking, Organometallics, 28, 3901 (2009)). The variability of phosphanes and the possibility to manipulate their electronic and steric properties substantiates the preference of their use as compared to many other ligand systems. Therefore, phosphanes are employed in a wide variety of reactions, such as palladium-catalyzed coupling reactions (M. A. Wünsche et al., Angew. Chem. Int. Ed., 54, 11857 (2015); D. S. Surry et al., Angew. Chem. Int. Ed., 47, 6338 (2008); R. Martin et al., Acc. Chem. Res., 41, 1461 (2008); S. Kotha et al., Tetrahedron, 58, 9633 (2002)), or gold-catalyzed hydroamination reactions (Lavallo, V. et al.; Angew. Chem., Int. Ed., 52, 3172 (2013); E. Mizushima et al., Org. Lett., 5, 3349 (2003); Y. Wang et al., Nature. Commun., 1 (2014)). Novel active catalyst systems are based on, inter alia, adamantyl-functionalized phosphanes (DE-A-10037961, WO 02/10178, L. Chen et al., J. Am. Chem. Soc., 138, 6392 (2016); C. A. Fleckenstein et al., Chem. Soc. Rev., 39, 694 (2010); K. A. Agnew-Francis et al., Adv. Synth. Catal., 358, 675 (2016)), or biaryl phosphane ligands (US 6,307,087, D. S. Surry et al., Angew. Chem., 120, 6438 (2008); Angew. Chem. Int. Ed., 47, 6338 (2008); R. A. Altman et al., Nat. Protoc., 2, 3115 (2007); D. S. Surry et al., Chem. Sci., 2, 27 (2011); E. J. Cho et al., Science, 328, 1679 (2010); D. A. Watson et al., Science, 325, 1661 (2009)). A survey of important homogeneous catalyses with phosphane ligands is found, for example, in B. Cornils, W. A. Hermann, Applied Homogenous Catalysis with Organometallic Compounds, Vol 12, VCH, Weinheim, 1996.

Ligand design is decisive in catalysis to enable reactions, or to be able to direct them into desired directions. Thus, for example, the development of new phosphane ligands is often required to realize more cost-effective starting substrates (e.g., chlorides instead of iodides), higher catalyst productivities and activities, and a broader substrate and reaction diversity.

BRIEF SUMMARY OF THE INVENTION

Aspect (1): Phosphane ligands of formulas $YPR^1R^2$ (I), $Y_2PR^1$ (II) and $Y_3P$ (III)

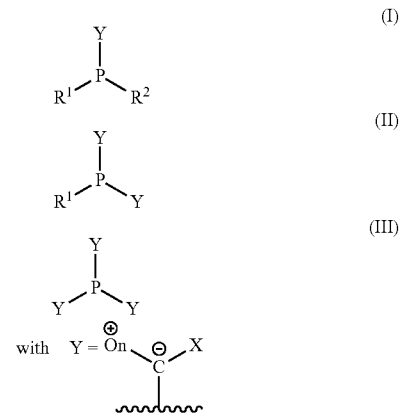

where

Y represents an ylide substituent bound to the phosphorus atom through the carbanionic center and having onium groups On and X groups, On, independently of the onium groups in other ylide substituents, is selected from phosphonium groups —$P(R^3R^4R^5)$, ammonium groups —$N(R^3R^4R^5)$, sulfoxonium groups —$SOR^3R^4$ and sulfonium groups —$S(R^3R^4)$, X, independently of the X groups in other ylide substituents, is selected from hydrogen, alkyl, aryl, alkenyl and heteroaryl groups that may be unsubstituted or substituted with functional groups, silyl (—$SiR^3R^4R^5$), sulfonyl (—$SO_2R^3$), phosphoryl (—$P(O)R^3R^4$, —$P(S)R^3R^4$, —$P(NR^3)R^4R^5_2$), cyano (—CN), alkoxy (—$OR^3$) and amino (—$NR^3R^4$) groups, and $R^1$, $R^2$, $R^3$, $R^4$ and $R^5$, if any, are independently selected from alkyl, aryl and heteroaryl groups that may be unsubstituted or substituted with functional groups, with the proviso that $R^1$ and $R^2$ are not methyl if X is hydrogen or trimethylsilyl and Z is trimethylphosphonium, or that $R^1$ and $R^2$ are not phenyl if X is p-toluylsulfonyl (—$SO_2$(p-toluyl)) and Z is triphenylphosphonium.

2. The phosphane ligands according to item 1, wherein
(i) the alkyl groups are selected from linear, branched-chain or cyclic $C_{1-10}$ alkyl groups, preferably from $C_{1-6}$ alkyl groups or $C_{4-10}$-cycloalkyl groups, the aryl groups are selected from $C_{6-14}$ aryl groups, preferably from $C_{6-10}$ aryl groups, the alkenyl groups are selected from mono- or polyunsaturated linear, branched-chain or cyclic $C_{2-10}$ alkenyl groups, preferably from $C_{2-6}$ alkenyl groups, and the heteroaryl groups are selected from $C_{6-14}$ heteroaryl groups, preferably from $C_{6-10}$ heteroaryl groups having 1 to 5 heteroatoms selected from N, O and S; and/or (ii) the functional groups are selected from alkyl (—$R^{11}$), especially $C_{1-6}$ alkyl groups, $C_{6-10}$ aryl (—$R^{12}$), halogen (—Hal), hydroxy (—OH), cyano (—CN), alkoxy (—$OR^3$), amino (—$NR^{11}_2$, —$NHR^{11}$, —$NH_2$), mercapto (—SH, —$SR^{11}$), wherein $R^{11}$, independently of further $R^{11}$ residues, is selected from $C_{1-6}$ alkyl residues.

3. The phosphane ligands according to item 1 or 2, represented by formula (I) or (II)

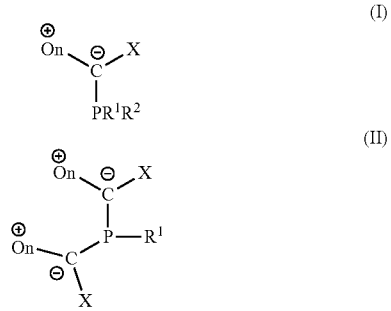

wherein On is a phosphonium group —$P(R^3R^4R^5)$, in which $R^3$, $R^4$ and $R^5$ are independently selected from the group consisting of $C_{1-6}$ alkyl groups, $C_{4-10}$ cycloalkyl groups, $C_{6-10}$ aryl groups, X is selected from the group consisting of linear, branched-chain or cyclic $C_{1-6}$ alkyl groups, $C_{6-10}$ aryl groups, mono- or polyunsaturated linear, branched-chain or cyclic $C_{2-6}$ alkenyl groups, a trialkylsilyl (—$SiR^3R^4R^5$), arylsulfonyl ($R^{12}$—$SO_2R^3$) group, and $R^1$ and $R^2$ are $C_{6-10}$ aryl groups or $C_{1-6}$ alkyl and cycloalkyl groups.

4. The phosphane ligands according to one or more of the preceding items, wherein $R^3$, $R^4$ and $R^5$ are independently selected from the group consisting of methyl, ethyl, butyl, cyclohexyl, phenyl, and combinations thereof.

5. The phosphane ligands according to one or more of the preceding items, wherein $R^3$, $R^4$ and $R^5$ are the same and are selected from the group consisting of methyl, ethyl, butyl, cyclohexyl, phenyl, and combinations thereof, especially cyclohexyl and phenyl.

6. The phosphane ligands according to one or more of the preceding items, wherein X is selected from the group consisting of methyl, ethyl, cyclohexyl, phenyl, p-tolyl, trimethylsilyl, p-tolylsulfonyl, or combinations thereof.

7. The phosphane ligands according to one or more of the preceding items, wherein $R^1$ and $R^2$ are independently selected from the group consisting of phenyl, cyclohexyl, methyl, and combinations thereof.

Aspect (2):

8. A process for preparing the phosphane ligands according to any of items 1 to 3, comprising
   (a) the reaction of a metallated ylide with a halophosphane, a dihalophosphane, or phosphorus trichloride,
   (b) the reaction of an ylide-functionalized halophosphane or dihalophosphane with an organometallic reagent,
   (c) the phosphanylation of an onium salt, phosphanylation with halophosphanes in the presence of a base, or
   (d) the deprotonation of an α-phosphanyl substituted onium salt with a base.

Aspect (3):

9. Use of the phosphane ligands according to any of items 1 to 3 in the synthesis of metal complexes or metal salts.

10. The use according to item 9, wherein said metal complexes or metal salts are precious metal or transition metal complexes or precious metal or transition metal compounds.

11. The use according to item 9 or 10, wherein said metal, precious metal or transition metal complexes and salts with the phosphane ligands according to any of items 1 to 7 are employed in homogeneous catalysis.

Aspect (4):

12. Use of the phosphane ligands according to any of items 1 to 7 in combination with metal, precious metal or transition metal complexes or metal, precious metal or transition metal salts as catalysts, wherein the ligands are added to the metal, precious metal or transition metal precursor compounds in situ, or the isolated metal, precious metal or transition metal complexes of the phosphane ligands according to aspect (3) are employed.

13. The use according to items 9 to 12, wherein the metals platinum, palladium and nickel, preferably palladium, are used.

14. The use according to items 9 to 13, wherein the metals copper, silver and gold, preferably gold, are used.

15. The use according to items 9 to 14, wherein the ligands are employed
   (i) in catalytic hydrofunctionalization reactions of alkynes and alkenes;
   (ii) in catalytic hydroamination reactions of alkynes and alkenes;
   (iii) in catalytic O—H addition reactions to alkynes and alkenes;
   (iv) in catalytic coupling reactions;
   (v) in catalytic Suzuki coupling reactions, especially for the preparation of biaryls;
   (vi) in catalytic cross-coupling reactions, especially C—N and C—O coupling reactions; and/or
   (vii) in catalytic Heck coupling reactions, especially for the preparation of arylated olefins, and Sonogashira coupling reactions, especially for the preparation of arylated and alkenylated alkynes.

Aspect (5):

16. Metal complexes containing a phosphane ligand of formulas $YPR^1R^2$ (I), $Y_2PR^1$ (II) and $Y_3P$ (III)

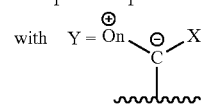

where
Y represents an ylide substituent bound to the phosphorus atom through the carbanionic center and having onium groups On and X groups, On, independently of the onium groups in other ylide substituents, is selected from phosphonium groups —$P(R^3R^4R^5)$, ammonium groups —$N(R^3R^4R^5)$, sulfonium groups —$SOR^3R^4$ and sulfonium groups —$S(R^3R^4)$, X, independently of the X groups in other ylide substituents, is selected from hydrogen, alkyl, aryl, alkenyl and heteroaryl groups that may be unsubstituted or substituted with functional groups, silyl (—SiR$^3$$_3$R$^4$R$^5$), sulfonyl (—SO$_2$R$^3$), phosphoryl (—P(O)R$^3$R$^4$, —P(S)R$^3$R$^4$, —P(NR$^3$)R$^4$R$^5$$_2$), cyano (—CN), alkoxy (—OR) and amino (—NR$^2$) groups, and R$^1$, R$^2$, R$^3$, R$^4$ and R$^5$, if any, are independently selected from alkyl, aryl and heteroaryl groups that may be unsubstituted or substituted with functional groups, with the proviso that R$^1$ and R$^2$ are not methyl if X is hydrogen or trimethylsilyl and Z is trimethylphosphonium, or that R$^1$ and R$^2$ are not phenyl if X is p-toluylsulfonyl (—SO$_2$(p-toluyI)) and Z is triphenylphosphonium.

17. The metal complexes according to item 16, wherein (i) the alkyl groups are selected from linear, branched-chain or cyclic C$_{1-10}$ alkyl groups, preferably from C$_{1-6}$ alkyl groups or C$_{4-10}$-cycloalkyl groups, the aryl groups are selected from C$_{6-14}$ aryl groups, preferably from C$_{6-10}$ aryl groups, the alkenyl groups are selected from mono- or polyunsaturated linear, branched-chain or cyclic C$_{2-10}$ alkenyl groups, preferably from C$_{2-6}$ alkenyl groups, and the heteroaryl groups are selected from C$_{6-14}$ heteroaryl groups, preferably from C$_{6-10}$ heteroaryl groups having 1 to 5 heteroatoms selected from N, O and S; and/or (ii) the functional groups are selected from alkyl (—R$^{11}$), especially C$_{1-6}$ alkyl groups, C$_{6-10}$ aryl (—R$^{12}$), halogen (—Hal), hydroxy (—OH), cyano (—CN), alkoxy (—OR$^3$), amino (—NR$^{11}$$_2$, —NHR$^{11}$, —NH$_2$), mercapto (—SH, —SR$^{11}$), wherein R$^{11}$, independently of further R$^{11}$ residues, is selected from C$_{1-6}$ alkyl residues.

18. The metal complexes according to item 16 or 17, having phosphane ligands of formula (I) or (II)

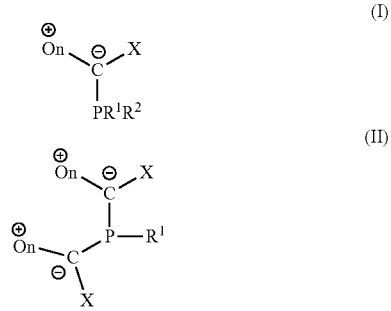

wherein On is a phosphonium group —P(R$^3$R$^4$R$^5$), in which R$^3$, R$^4$ and R$^5$ are independently selected from the group consisting of C$_{1-6}$ alkyl groups, C$_{4-10}$ cycloalkyl groups, C$_{6-10}$ aryl groups, X is selected from the group consisting of linear, branched-chain or cyclic C$_{1-6}$ alkyl groups, C$_{6-10}$ aryl groups, mono- or polyunsaturated linear, branched-chain or cyclic C$_{2-6}$ alkenyl groups, a trialkylsilyl (—SiR$^3$R$^4$R$^5$), arylsulfonyl (R$^{12}$—SO$_2$R$^3$) group, and R$^1$ and R$^2$ are C$_{6-10}$ aryl groups or C$_{1-6}$ alkyl and cycloalkyl groups.

19. The metal complexes according to one or more of the above items, wherein R$^3$, R$^4$ and R$^5$ are independently selected from the group consisting of methyl, ethyl, butyl, cyclohexyl, phenyl, and combinations thereof.

20. The metal complexes according to one or more of the preceding items, wherein R$^3$, R$^4$ and R$^5$ are the same and are selected from the group consisting of methyl, ethyl, butyl, cyclohexyl, phenyl, and combinations thereof, especially cyclohexyl and phenyl.

21. The metal complexes according to one or more of the preceding items, wherein X is selected from the group consisting of methyl, ethyl, cyclohexyl, phenyl, p-tolyl, trimethylsilyl, p-tolylsulfonyl, or combinations thereof.

22. The metal complexes according to one or more of the preceding items, wherein R$^1$ and R$^2$ are independently selected from the group consisting of phenyl, cyclohexyl, methyl, tert-butyl and combinations thereof.

23. The metal complexes according to items 18 to 22, wherein said complex is a palladium allyl complex having the following structure (V) or (VI):

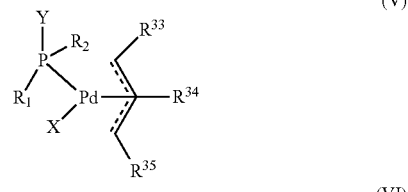

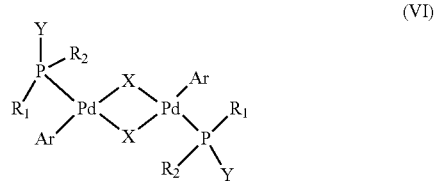

wherein X is an anion,

Y, R$^1$, R$^2$ are defined as in the preceding items,

R$^{33}$, R$^{34}$ and R$^{35}$ are independently selected from H, alkyl, aryl and heteroaryl groups that may be unsubstituted or substituted with functional groups; or at least two of R$^{33}$, R$^{34}$ and R$^{35}$ form a carbocyclic ring with 5 to 14 carbon atoms, Ar represents a substituted or unsubstituted, especially a substituted, aryl group.

24. The metal complexes according to item 23, wherein R$^{33}$, R$^{34}$ and R$^{35}$ are independently selected from linear, branched-chain or cyclic C$_{1-10}$ alkyl groups, preferably from C$_{1-6}$ alkyl groups or C$_{4-10}$-cycloalkyl groups, the aryl groups are selected from C$_{6-14}$ aryl groups, preferably from C$_{6-10}$ aryl groups, the alkenyl groups are selected from mono- or polyunsaturated linear, branched-chain or cyclic C$_{2-10}$ alkenyl groups, preferably from C$_{2-6}$ alkenyl groups, and the heteroaryl groups are selected from C$_{6-14}$ heteroaryl groups, preferably from C$_{6-10}$ heteroaryl groups having 1 to 5 heteroatoms selected from N, 0 and S, wherein all of the groups mentioned above may be substituted with functional groups; and/or at least two of R$^{33}$, R$^{34}$ and R$^{35}$ form a carbocyclic ring that is a C$_{4-10}$ cycloalkyl group, or a C$_{6-14}$ aryl group, which may be substituted with one or more functional groups; and Ar are selected from C$_{6-14}$ aryl groups, preferably C$_{6-10}$ aryl groups, and the heteroaryl groups are selected from C$_{6-14}$ heteroaryl groups, preferably from C$_{6-10}$ heteroaryl groups having 1 to 5 heteroatoms selected from N, O and S, wherein all of the groups mentioned above may be substituted with functional groups; and the functional groups are selected from alkyl (—R$^{11}$), especially C$_{1-6}$ alkyl groups, C$_{6-10}$ aryl (—R$^{12}$), halogen (—Hal), hydroxy (—OH), cyano (—CN), alkoxy (—OR$^3$), amino (—NR$^{11}$$_2$, —NHR$^{11}$, —NH$_2$), mercapto (—SH, —SR$^{11}$), wherein R$^{11}$, independently of further R$^{11}$ residues, is selected from C$_{1-6}$ alkyl residues.

25. The metal complexes according to item 23 or 24, wherein X is selected from the group of halogen, tosylate, nosylate and mesylate.

26. The metal complexes according to one or more of the preceding items, wherein X is selected from the group of fluorine, chlorine, bromine, iodine, tosylate, nosylate and mesylate, and/or aryl is selected from phenyl, m-tolyl, p-tolyl, o-tolyl, mesityl, 1,3-diisopropylphenyl.

27. A process for performing a coupling reaction containing the steps of
providing a reaction mixture containing at least a substrate, coupling partner, and a metal complex according to item 16 to 26, or a metal complex containing a ligand according to item 1; and
reacting said substrate with said coupling partner in the presence of the metal complex or its derivative to form a coupling product.

28. The process according to item 27, wherein the metal of said metal complex is a precious metal and/or a transition metal.

29. The process according to item 27 or 28, wherein the metal of said metal complex is a metal of group 10 or 11 of the Periodic Table of the elements.

30. The process according to one or more of items 27 to 29, wherein the metal of said metal complex is selected from the group consisting of copper, silver, gold, platinum, palladium, nickel, and combinations thereof.

31. The process according to one or more of items 27 to 30, wherein the substrate is a substituted aromatic compound.

32. The process according to item 31, wherein said substituted aromatic compound is an aromatic or heteroaromatic compound.

33. The process according to item 31 or 32, wherein said substituted aromatic compound is substituted with a leaving group, or an unsaturated aliphatic group, or a leaving group.

34. The process according to item 33, wherein said leaving group is selected from the group consisting of halogen, tosylate, nosylate and mesylate, and/or said unsaturated aliphatic group is selected from the group consisting of alkene or alkyne, especially with 2 to 12, especially with 2 to 8, carbon atoms.

35. The process according to one or more of the preceding items, wherein the coupling partner comprises an organometallic compound.

36. The process according to item 35, wherein said organometallic compound is selected from the group consisting of organic boron compounds, organolithium compounds, organozinc compounds, organolithium compounds, and Grignard compounds.

37. The process according to item 35 or 36, wherein said organometallic compound includes at least one aromatic residue.

38. The process according to item 36, wherein said organometallic compound includes at least one unsaturated aliphatic residue.

39. The process according to item 36, wherein said organometallic compound includes at least one saturated aliphatic residue.

40. The process according to one or more of items 27 to 39, wherein the coupling reaction may be selected from the group consisting of
(i) catalytic hydrofunctionalization reactions of alkynes and alkenes;
(ii) catalytic hydroamination reactions of alkynes and alkenes;
(iii) catalytic 0-H addition reactions to alkynes and alkenes;
(iv) catalytic coupling reactions;
(v) catalytic Suzuki coupling reactions, especially for the preparation of biaryls;
(vi) catalytic cross-coupling reactions, especially C—N and C—O coupling reactions; and/or
(vii) catalytic Heck coupling reactions, especially for the preparation of arylated olefins, and Sonogashira coupling reactions, especially for the preparation of arylated and alkenylated alkynes.

41. Use of the metal complexes according to items 16 to 26 in homogeneous catalysis, advantageously in coupling reactions, which may be selected from the group consisting of
(i) catalytic hydrofunctionalization reactions of alkynes and alkenes;
(ii) catalytic hydroamination reactions of alkynes and alkenes;
(iii) catalytic 0-H addition reactions to alkynes and alkenes;
(iv) catalytic coupling reactions;
(v) catalytic Suzuki coupling reactions, especially for the preparation of biaryls;
(vi) catalytic cross-coupling reactions, especially C—N and C—O coupling reactions; and/or
(vii) catalytic Heck coupling reactions, especially for the preparation of arylated olefins, and Sonogashira coupling reactions, especially for the preparation of arylated and alkenylated alkynes.

DETAILED DESCRIPTION OF THE INVENTION

It has now been found that the ylide-functionalized phosphane ligands of formulas (I), (II) and (III) having a carbanionic carbon center in α-position to the phosphorus atom as described below and their transition metal complexes achieve the above object. Thus, the invention relates to:

(1) phosphane ligands of formulas YPRR' (I), Y$_2$PR (II) and Y$_3$P (III)

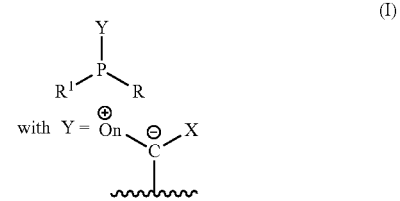

where
Y represents an ylide substituent bound to the phosphorus atom through the carbanionic center and having onium groups On and X groups,
On, independently of the onium groups in other ylide substituents, is selected from phosphonium groups —PRR'$_2$, ammonium groups —NRR'$_2$, sulfoxonium groups —SOR$_2$ and sulfonium groups —SRR',
X, independently of the X groups in other ylide substituents, is selected from hydrogen, alkyl, aryl, alkenyl and heteroaryl groups that may be unsubstituted or substituted with functional groups, silyl (—SiR$_3$), sulfonyl (—SO$_2$R), phosphoryl (—P(P)R$_2$, —P(S)R$_2$, —P(NR)R$_2$), cyano (—CN), alkoxy (—OR) and amino groups (—NR$_2$), and
R and R', if any, are independently selected from alkyl, aryl and heteroaryl groups that may be unsubstituted or substituted with functional groups;

(2) a process for preparing the phosphane ligands according to aspect (1), comprising
(a) the reaction of a metallated ylide with a halophosphane, a dihalophosphane, or phosphorus trichloride,
(b) the reaction of an ylide-functionalized halophosphane or dihalophosphane with an organometallic reagent,
(c) the phosphanylation of an onium salt, phosphanylation with halophosphanes in the presence of a base, or
(d) the deprotonation of an α-phosphanyl substituted onium salt with a base;

(3) the use of the phosphane ligands according to aspect (1) in the synthesis of transition metal complexes or transition metal salts; and (4) the use of the phosphane ligands according to aspect (1) in combination with transition metal complexes or transition metal salts as catalysts, wherein the ligands are added to the transition metal precursor compounds in situ, or the isolated transition metal complexes of the phosphane ligands obtainable according to aspect (3) are employed.

Aspect (1) of the invention provides phosphane ligands of formulas YPRR' (I), $Y_2PR$ (II) and $Y_3P$ (III).

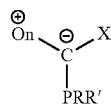

In the following, the ylide substituent is often abbreviated as Y, i.e.:

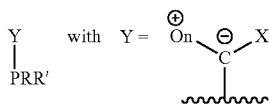

In the formula, R and R' represent alkyl, aryl and heteroaromatic residues with and without further functional groups (e.g., amines, ethers).

"On" describes a substituent with a positive charge, such as onium groups, mainly phosphonium groups —$PRR'_2$, ammonium —$NRR'_2$, sulfoxonium groups —$SOR_2$, or sulfonium groups —$SRR'$. The carbon atom directly bound to the phosphorus atom formally bears a negative charge.

X symbolizes alkyl, aryl or alkenyl groups both with and without further functional groups, heteroaromatics, as well as hydrogen or functional groups, such as silyl, sulfonyl (—$SO_2R$ with R=alkyl, aryl), phosphoryl (—$P(O)R_2$, —$P(S)R_2$, —$P(NR)R_2$), —CN, alkoxy (—OR), amino (—$NR_2$), wherein the residue R always includes alkyl and aryl residues.

Preferably, the alkyl groups are selected from linear, branched-chain or cyclic $C_{1-10}$ alkyl groups, preferably from $C_{1-6}$ alkyl groups, the aryl groups are selected from $C_{6-14}$ aryl groups, preferably from $C_{6-10}$ aryl groups, the alkenyl groups are selected from mono- or polyunsaturated linear, branched-chain or cyclic $C_{2-10}$ alkenyl groups, preferably from $C_{2-6}$ alkenyl groups, and the heteroaryl groups are selected from $C_{4-14}$ heteroaryl groups, preferably from $C_{6-10}$ heteroaryl groups having 1 to 5 heteroatoms selected from B, N, O and S. It is further preferred that the functional groups are selected from alkyl (—R''), perfluoroalkyl (—$C_xF_{2x+1}$, with x=1 to 6, such as —$CF_3$, —$C_2F_5$ etc.), halogen (—Hal), hydroxy (—OH), cyano (—CN), alkoxy (—OR''), carbonyl (—$CO_2H$, —$CO_2R''$, —COR'', —CONHR''), amino (—$NR''_2$, —NHR'', —$NH_2$), amido (—NHCOR'', —$NHSO_2R''$), mercapto (—SH, —SR''), sulfonyl (—$SO_3H$, —$SO_2R''$), phosphorus (—$PR''_3$, —$P(O)R''_2$, —$P(S)R''_2$, —$P(NR)R''_2$), silyl (—$SiR''_3$) and nitro groups, wherein R'', independently of further R'' residues, is selected from $C_{1-6}$ alkyl and $C_{6-14}$ aryl residues.

In addition to the simple ylide substitution, the phosphanes may also be doubly and triply ylide-substituted to obtain phosphanes of formulas (II) $Y_2PR$ and (III) $Y_3P$. A preferred embodiment of aspect (11 are phosphane ligands of formula (I)

where On is a triarylphosphonium group, especially a triphenylphosphonium group, X is a trialkylsilyl, cyano (—CN), methyl or arylsulfonyl group, especially a trimethylsilyl or p-tolylsulfonyl group, and R and R' are aryl or alkyl groups, especially phenyl, cyclohexyl or methyl groups.

Aspect (2) of this invention relates to the preparation of the ylide-functionalized phosphane ligands according to the invention. They can be prepared via two alternative synthetic pathways, which allows for a broad variation of the substitution pattern: The synthesis can be achieved either through an α-metallated ylide, which is reacted with a corresponding chlorophosphane (route A), or through the α-deprotonation of an α-phosphanyl-substituted phosphonium salt (route B).

Route A: The α-metallated ylides required for route A can be prepared by the deprotonation of classical ylides with metal bases, such as organolithium compounds or alkali metal amides (T. Scherpf et al., Angew. Chem. Int. Ed., 54, 8542 (2015); Bestmann, H. J. et al.; Angew. Chem. Int. Ed., 26, 79 (1987)). The reaction thereof with chlorophosphanes of the type RR'PCl (R, R'=alkyl, aryl residues) yields the ylide-functionalized phosphane on a direct route. When phosphorus trichloride is used, ylide-functionalized chlorophosphanes of the type $YPCl_2$ can also be prepared, which can be reacted in a further step with organometallic reagents (or organolithium, organomagnesium and organozinc reagents) to form an alkyl/aryl phosphane. Reactions of chlorophosphanes with metal bases are described, for example, in Houben-Weyl, Methoden der organischen Chemie, 1963, volume XII, 1 S33. The use of phosphorus trichloride and dichlorophosphanes also enables access to multiply ylide-substituted phosphanes.

Route B: Preparation method B is a practical alternative to route A, which circumvents the isolation of sensitive metallated intermediates. Proceeding from a classical onium salts, the introduction of the phosphane moiety is effected by using a halophosphane in the presence of a base. When an excess of base is used, the formation of the ylide-functionalized phosphane is achieved on a direct route. Thus, this method allows for the preparation of the ligands from readily available starting substances or from commercially available precursors.

The novel phosphanes are reacted with transition metal compounds to form the corresponding complexes, such as with compounds of the metals Ni, Pd, Pt, Rh, Ir, Cu and Au. The complexes can be either isolated as solids, or generated in situ and used further for catalytic applications. In the complexes, the phosphane ligands prove to be very strong donor ligands whose donor capabilities exceeds that of classical phosphane ligands. This could be demonstrated by means of the Tolman parameter (TEP), i.e., by means of infrared spectroscopy and determination of the CO stretching vibration in the corresponding Rh(acac)(CO)L complexes (with L=phosphane ligand, and acac =acetylacetonato) (C. A. Tolman, Chem. Rev. 77, 313 (1977)).

The transition metal complexes of the ylide-functionalized phosphane ligands are employed in different homogeneously catalyzed reactions, such as in palladium-catalyzed coupling reactions (e.g., C—C—, C—O, C—N couplings), and gold-catalyzed hydroamination reactions. In these reactions, they exhibit extraordinarily high activities that exceed those of analogous complexes with common phosphane ligands. Thus, in the gold-catalyzed hydroamination of alkynes, high conversion rates are observed already at room temperature. In part, TONs of more than 10,000 are achieved. Analogous reactions with other phosphane ligands usually require higher reaction temperatures of further additions of additives (D. Malhotra et al., Angew. Chem. Int. Ed., 53, 4456 (2014); E. Mizushima et al., Org. Lett., 5, 3349 (2003)). In addition, the systems in part proved to be extremely robust towards water and atmospheric oxygen, so that catalyses could be performed also without taking further precautionary protective measures. This applies, for example, to the autocatalyzed hydroamination of phenylacetylene, which did not show any decrease in catalytic activity even in the presence of water. In the case of the palladium-catalyzed coupling and cross-coupling reactions, comparably mild reaction conditions could be applied, and even couplings of aryl chlorides could be realized. For example, in the case of C—N coupling reactions, high conversion rates even with difficult substrates could be achieved already at room temperature.

Therefore, the invention relates to phosphane ligands of formulas $YPR^1R^2$ (I), $Y_2PR^1$ (II) and $Y_3P$ (III)

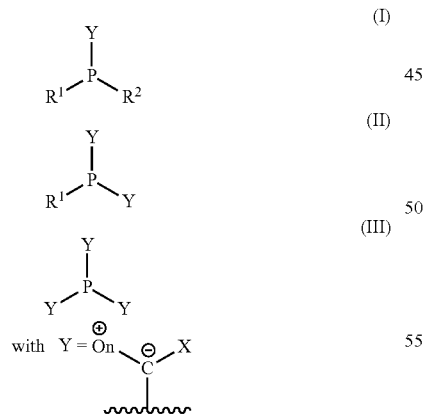

where

Y represents an ylide substituent bound to the phosphorus atom through the carbanionic center and having onium groups On and X groups, On, independently of the onium groups in other ylide substituents, is selected from phosphonium groups —$P(R^3R^4R^5)$, ammonium groups —$N(R^3R^4R^5)$, sulfoxonium groups —$SOR^3R^4$ and sulfonium groups —$S(R^3R^4)$, X, independently of the X groups in other ylide substituents, is selected from hydrogen, alkyl, aryl, alkenyl and heteroaryl groups that may be unsubstituted or substituted with functional groups, silyl (—$SiR^3R^4R^5$), sulfonyl (—$SO_2R^3$), phosphoryl (—$P(O)R^3R^4$, —$P(S)R^3R^4$, —$P(NR^3)R^4R^5{}_2$), cyano (—CN), alkoxy (—$OR^3$) and amino (—$NR^3R^4$) groups, and $R^1$, $R^2$, $R^3$, $R^4$ and $R^5$, if any, are independently selected from alkyl, aryl and heteroaryl groups that may be unsubstituted or substituted with functional groups;

especially with the proviso that $R^1$ and $R^2$ are not methyl if X is hydrogen or trimethylsilyl and Z is trimethylphosphonium, or that $R^1$ and $R^2$ are not phenyl if X is p-toluylsulfonyl (—$SO_2$(p-toluyl)) and Z is triphenylphosphonium.

In these ligands:
(i) the alkyl groups are selected from linear, branched-chain or cyclic $C_{1-10}$ alkyl groups, preferably from $C_{1-6}$ alkyl groups, the aryl groups are selected from $C_{6-14}$ aryl groups, preferably from $C_{6-10}$ aryl groups, the alkenyl groups are selected from mono- or polyunsaturated linear, branched-chain or cyclic $C_{2-10}$ alkenyl groups, preferably from $C_{2-6}$ alkenyl groups, and the heteroaryl groups are selected from $C_{6-14}$ heteroaryl groups, preferably from $C_{6-10}$ heteroaryl groups having 1 to 5 heteroatoms selected from B, N, O and S, and/or
(ii) the functional groups are selected from alkyl (—$R^{11}$), perfluoroalkyl (—$C_xF_{2x+1}$, with x=1 to 6, such as —$CF_3$, —$C_2F_5$ etc.), halogen (—Hal), hydroxy (—OH), cyano (—CN), alkoxy (—OR"), carbonyl (—$CO_2H$, —$CO_2R"$, —COR", —CONHR"), amino (—NR"$_2$, —NHR", —$NH_2$), amido (—NHCOR", —$NHSO_2R"$), mercapto (—SH, —SR"), sulfonyl (—$SO_3H$, —$SO_2R"$), phosphorus (—PR"$_3$, —$P(O)R"_2$, —$P(S)R"_2$, —$P(NR)R"_2$), silyl (—SiR"$_3$) and nitro groups, wherein R", independently of further R" residues, is selected from $C_{1-6}$ alkyl and $C_{6-14}$ aryl residues.

A specific embodiment relates to phosphane ligands represented by formula (I) or (II)

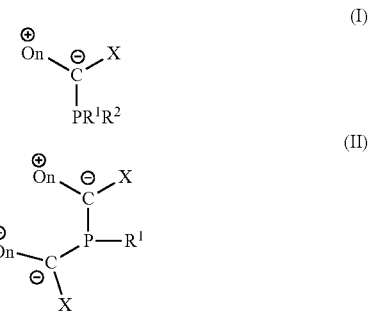

wherein On is a phosphonium group —$P(R^3R^4R^5)$, in which $R^3$, $R^4$ and $R^5$ are independently selected from the group consisting of $C_{1-6}$ alkyl groups, $C_{4-10}$ cycloalkyl groups, $C_{6-10}$ aryl groups, X is selected from the group consisting of linear, branched-chain or cyclic $C_{1-6}$ alkyl groups, $C_{6-10}$ aryl groups, mono- or polyunsaturated linear, branched-chain or cyclic $C_{2-6}$ alkenyl groups, a trialkylsilyl (—$SiR^3R^4R^5$), arylsulfonyl ($R^{12}$—$SO_2R^3$) group, and $R^1$ and $R^2$ are $C_{6-10}$ aryl groups or $C_{1-6}$ alkyl and cycloalkyl groups.

$R^3$, $R^4$ and $R^5$ may be independently selected from the group consisting of methyl, ethyl, butyl, cyclohexyl, phenyl, and combinations thereof. $R^3$, $R^4$ and $R^5$ may be the same and selected from the group consisting of methyl, ethyl, butyl, cyclohexyl, phenyl, and combinations thereof, especially cyclohexyl.

X may be selected from the group consisting of methyl, ethyl, cyclohexyl, phenyl, p-tolyl, trimethylsilyl, p-tolylsulfonyl, or combinations thereof.

$R^1$ and $R^2$ may be independently selected from the group consisting of phenyl, cyclohexyl, methyl, and combinations thereof.

Another embodiment relates to a process for preparing the phosphane ligands, comprising
(a) the reaction of a metallated ylide with a halophosphane, a dihalophosphane, or phosphorus trichloride,
(b) the reaction of an ylide-functionalized halophosphane or dihalophosphane with an organometallic reagent,
(c) the phosphanylation of an onium salt with halophosphanes in the presence of a base, or
(d) the deprotonation of an aα-phosphanyl substituted onium salt with a base.

The phosphane ligands may be used in the synthesis of metal complexes or metal salts. In particular, these may be precious metal or transition metal complexes or precious metal or transition metal compounds. In particular, metals of group 10 or 11 of the Periodic Table of the elements may be employed.

The metal, precious metal or transition metal complexes and salts with the phosphane ligands as described above may be employed in homogeneous catalysis.

In particular, the phosphane ligands according to aspect (3) may be employed in combination with metal, precious metal or transition metal complexes or metal, precious metal or transition metal salts as catalysts, wherein the ligands are added to the metal, precious metal or transition metal precursor compounds in situ, or the isolated metal, precious metal or transition metal complexes of the phosphane ligands according to aspect (3) may be employed in the synthesis of transition metal complexes or transition metal salts.

In one embodiment, the metals platinum, palladium and nickel, preferably palladium, may be used In another embodiment, the metals copper, silver and gold, preferably gold, may be used.

In the above uses, the ligands may be employed
(i) in catalytic hydrofunctionalization reactions of alkynes and alkenes;
(ii) in catalytic hydroamination reactions of alkynes and alkenes;
(iii) in catalytic O—H addition reactions to alkynes and alkenes;
(iv) in catalytic coupling reactions;
(v) in catalytic Suzuki coupling reactions, especially for the preparation of biaryls;
(vi) in catalytic cross-coupling reactions, especially C—N and C—O coupling reactions; and/or
(vii) in catalytic Heck coupling reactions, especially for the preparation of arylated olefins, and Sonogashira coupling reactions, especially for the preparation of arylated and alkenylated alkynes.

In particular, the patent application further relates to metal complexes containing a phosphane ligand of formulas $YPR^1R^2$ (I), $Y_2PR^1$ (II) and $Y_3P$ (III)

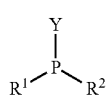
(I)

(II)

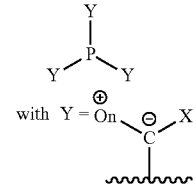
(III)

where

Y represents an ylide substituent bound to the phosphorus atom through the carbanionic center and having onium groups On and X groups, On, independently of the onium groups in other ylide substituents, is selected from phosphonium groups —P($R^3R^4R^5$), ammonium groups —N($R^3R^4R^5$), sulfoxonium groups —SOR$^3R^4$ and sulfonium groups —S($R^3R^4$), X, independently of the X groups in other ylide substituents, is selected from hydrogen, alkyl, aryl, alkenyl and heteroaryl groups that may be unsubstituted or substituted with functional groups, silyl (—SiR$^3{}_3R^4R^5$), sulfonyl (—SO$_2R^3$), phosphoryl (—P(O)R$^3R^4$, —P(S)R$^3R^4$, —P(NR$^3$)R$^4R^5{}_2$), cyano (—CN), alkoxy (—OR$^3$) and amino (—NR$^3R^4$) groups, and $R^1$, $R^2$, $R^3$, $R^4$ and $R^5$, if any, are independently selected from alkyl, aryl and heteroaryl groups that may be unsubstituted or substituted with functional groups, with the proviso that $R^1$ and $R^2$ are not methyl if X is hydrogen or trimethylsilyl and Z is trimethylphosphonium, or that $R^1$ and $R^2$ are not phenyl if X is p-toluylsulfonyl (—SO$_2$(p-toluyl)) and Z is triphenylphosphonium.

The alkyl groups may be selected from linear, branched-chain or cyclic $C_{1-10}$ alkyl groups, preferably from $C_{1-6}$ alkyl groups or $C_{4-10}$-cycloalkyl groups, the aryl groups are selected from $C_{6-14}$ aryl groups, preferably from $C_{6-10}$ aryl groups, the alkenyl groups are selected from mono- or polyunsaturated linear, branched-chain or cyclic $C_{2-10}$ alkenyl groups, preferably from $C_{2-6}$ alkenyl groups, and the heteroaryl groups are selected from $C_{6-14}$ heteroaryl groups, preferably from $C_{6-10}$ heteroaryl groups having 1 to 5 heteroatoms selected from N, O and S; and/or (ii) the functional groups are selected from alkyl (—R$^{11}$), especially $C_{1-6}$ alkyl groups, $C_{6-10}$ aryl (—R$^{12}$), halogen (—Hal), hydroxy (—OH), cyano (—CN), alkoxy (—OR$^3$), amino (—NR$^{11}{}_2$, —NHR$^{11}$, —NH$_2$), mercapto (—SH, —SR$^{11}$), wherein R$^{11}$, independently of further R$^{11}$ residues, is selected from $C_{1-6}$ alkyl residues.

The metal complexes may be, in particular, precious metal or transition metal complexes or precious metal or transition metal compounds. In particular, metals of group 10 or 11 of the Periodic Table of Elements may be employed.

In one embodiment, the metals platinum, palladium and nickel, preferably palladium, may be used.

In another embodiment, the metals copper, silver and gold, preferably gold, may be used. Advantageously, these may be metal complexes having phosphane ligands of formula (I) or (II)

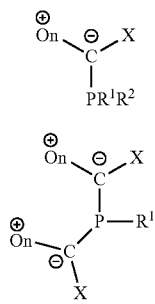

(I)

(II)

wherein On is a phosphonium group —$P(R^3R^4R^5)$, in which $R^3$, $R^4$ and $R^5$ are independently selected from the group consisting of $C_{1-6}$ alkyl groups, $C_{4-10}$ cycloalkyl groups, $C_{6-10}$ aryl groups, X is selected from the group consisting of linear, branched-chain or cyclic $C_{1-6}$ alkyl groups, $C_{6-10}$ aryl groups, mono- or polyunsaturated linear, branched-chain or cyclic $C_{2-6}$ alkenyl groups, a trialkylsilyl (—$SiR^3R^4R^5$), arylsulfonyl ($R^{12}$—$SO_2R^3$) group, and $R^1$ and $R^2$ are $C_{6-10}$ aryl groups or $C_{1-6}$ alkyl and cycloalkyl groups.

In particular, $R^3$, $R^4$ and $R^5$ may be independently selected from the group consisting of methyl, ethyl, butyl, cyclohexyl, phenyl, and combinations thereof, or $R^3$, $R^4$ and $R^5$ may be the same and be selected from the group consisting of methyl, ethyl, butyl, cyclohexyl, phenyl, and combinations thereof, especially cyclohexyl and phenyl.

In the metal complexes, X may be selected from the group consisting of methyl, ethyl, cyclohexyl, phenyl, p-tolyl, trimethylsilyl, p-tolylsulfonyl, or combinations thereof.

Also, $R^1$ and $R^2$ may be independently selected from the group consisting of phenyl, cyclohexyl, methyl, tert-butyl, and combinations thereof.

Advantageous ligands may be, in particular, ligands of the above formulas (I) or (II) with the substituents according to the following Table 1:

| No. | R1, R2 | On | X |
|---|---|---|---|
| 1 | tert-butyl | PPh3 | phenyl |
| 2 | phenyl | PPh3 | phenyl |
| 3 | methyl | PPh3 | phenyl |
| 4 | cyclohexyl | PPh3 | phenyl |
| 5 | tert-butyl | PCy3 | phenyl |
| 6 | phenyl | PCy3 | phenyl |
| 7 | methyl | PCy3 | phenyl |
| 8 | cyclohexyl | PCy3 | phenyl |
| 9 | tert-butyl | PPh3 | methyl |
| 10 | phenyl | PPh3 | methyl |
| 11 | methyl | PPh3 | methyl |
| 12 | cyclohexyl | PPh3 | methyl |
| 13 | tert-butyl | PCy3 | methyl |
| 14 | phenyl | PCy3 | methyl |
| 15 | methyl | PCy3 | methyl |
| 16 | cyclohexyl | PCy3 | methyl |
| 17 | tert-butyl | PPh3 | trimethylsilyl |
| 18 | phenyl | PPh3 | trimethylsilyl |
| 19 | methyl | PPh3 | trimethylsilyl |
| 20 | cyclohexyl | PPh3 | trimethylsilyl |
| 21 | tert-butyl | PCy3 | trimethylsilyl |
| 22 | phenyl | PCy3 | trimethylsilyl |
| 23 | methyl | PCy3 | trimethylsilyl |
| 24 | cyclohexyl | PCy3 | trimethylsilyl |
| 25 | tert-butyl | PPh3 | tolylsulfonyl SO2Tol |
| 26 | phenyl | PPh3 | tolylsulfonyl SO2Tol |
| 27 | methyl | PPh3 | tolylsulfonyl SO2Tol |
| 28 | cyclohexyl | PPh3 | tolylsulfonyl SO2Tol |
| 29 | tert-butyl | PCy3 | tolylsulfonyl SO2Tol |
| 30 | phenyl | PCy3 | tolylsulfonyl SO2Tol |
| 31 | methyl | PCy3 | tolylsulfonyl SO2Tol |
| 32 | cyclohexyl | PCy3 | tolylsulfonyl SO2Tol | wherein PPh3 represents triphenylphosphine, and PCy3 represents tricyclohexylphosphine. The metal complexes may be, in particular, precious metal or transition metal complexes or precious metal or transition metal compounds. In particular, metals of group 10 or 11 of the Periodic Table of Elements may be employed.

In one embodiment, the metals platinum, palladium and nickel, preferably palladium, may be used.

In another embodiment, the metals copper, silver and gold, preferably gold, may be used.

The metal complexes may also have further ligands, such as neutral electron donor ligands, for example, dibenzylideneacetone (DBA), carbon monoxide CO, NHC ligands, phosphines, such as triphenylphosphine or tricyclohexylphosphine, and amines, such as triethylamine or tributylamine. Also, charged ligands, such as halogens, especially chloride, bromide and iodide, or the pseudohalides mesylate, triflate, acetate, may be present. Substituted or unsubstituted aryl and allyl ligands may also be present, as can mono- or diolefins, which may be linear or cyclic, such as cyclooctadiene.

Thus, advantageously, the metal complexes may additionally include, in particular, ligands selected from the group consisting of dibenzylideneacetone (DBA), carbon monoxide CO, triphenylphosphine, tricyclohexylphosphine, triethylamine, tributylamine, pyridyl, chloride, bromide, iodide, mesylate, triflate, acetate, allyl, phenyl, p-tolyl, o-tolyl, mesityl, cyclooctadiene, and combinations thereof.

In particular, metal complexes from the following Tables B to G may be employed.

Table B

Table B shows platinum complexes with at least one of the 32 phosphane ligands set forth in Table A, and one or more of the ligands selected from the group consisting of dibenzylideneacetone (DBA), carbon monoxide CO, triphenylphosphine, tricyclohexylphosphine, triethylamine, tributylamine, pyridyl, chloride, bromide, iodide, mesylate, triflate, acetate, allyl, phenyl, p-tolyl, o-tolyl, mesityl, cyclooctadiene, and combinations thereof.

Table C

Table C shows palladium complexes with at least one of the 32 phosphane ligands set forth in Table A, and one or more of the ligands selected from the group consisting of dibenzylideneacetone (DBA), carbon monoxide CO, triphenylphosphine, tricyclohexylphosphine, triethylamine, tributylamine, pyridyl, chloride, bromide, iodide, mesylate, triflate, acetate, allyl, phenyl, p-tolyl, o-tolyl, mesityl, cyclooctadiene, and combinations thereof.

Table D

Table D shows nickel complexes with at least one of the 32 phosphane ligands set forth in Table A, and one or more of the ligands selected from the group consisting of dibenzylideneacetone (DBA), carbon monoxide CO, triphenylphosphine, tricyclohexylphosphine, triethylamine, tributylamine, pyridyl, chloride, bromide, iodide, mesylate, triflate, acetate, allyl, phenyl, p-tolyl, o-tolyl, mesityl, cyclooctadiene, and combinations thereof.

Table E

Table E shows copper complexes with at least one of the 32 phosphane ligands set forth in Table A, and one or more of the ligands selected from the group consisting of dibenzylideneacetone (DBA), carbon monoxide CO, triphenylphosphine, tricyclohexylphosphine, triethylamine, tributylamine, pyridyl, chloride, bromide, iodide, mesylate, triflate, acetate, allyl, phenyl, p-tolyl, o-tolyl, mesityl, cyclooctadiene, and combinations thereof.

Table F

Table F shows silver complexes with at least one of the 32 phosphane ligands set forth in Table A, and one or more of the ligands selected from the group consisting of dibenzylideneacetone (DBA), carbon monoxide CO, triphenylphosphine, tricyclohexylphosphine, triethylamine, tributylamine, pyridyl, chloride, bromide, iodide, mesylate, triflate, acetate, allyl, phenyl, p-tolyl, o-tolyl, mesityl, cyclooctadiene, and combinations thereof.

Table G

Table G shows gold complexes with at least one of the 32 phosphane ligands set forth in Table A, and one or more of the ligands selected from the group consisting of dibenzylideneacetone (DBA), carbon monoxide CO, triphenylphosphine, tricyclohexylphosphine, triethylamine, tributylamine, pyridyl, chloride, bromide, iodide, mesylate, triflate, acetate, allyl, phenyl, p-tolyl, o-tolyl, mesityl, cyclooctadiene, and combinations thereof.

The metal complexes can be obtained in a per se known manner, such as by reacting metal salts or metal complexes, which advantageously already bear desirable further ligands (such as nickel tetracarbonyl, (THT)AuCl (THT=tetrahydrothiophene), allylpalladium(II) chloride dimer, palladium acetate, palladium chloride, or tris(dibenzylideneacetone)dipalladium(0)×dibenzylideneacetone), with one or more phosphane ligands, optionally in a suitable solvent.

The metal complexes described above may be employed in homogeneous catalysis, especially in coupling reactions, wherein said coupling reaction may be selected from the group consisting of
  (i) catalytic hydrofunctionalization reactions of alkynes and alkenes;
  (ii) catalytic hydroamination reactions of alkynes and alkenes;
  (iii) catalytic O—H addition reactions to alkynes and alkenes;
  (iv) catalytic coupling reactions;
  (v) catalytic Suzuki coupling reactions, especially for the preparation of biaryls;
  (vi) catalytic cross-coupling reactions, especially C—N and C—O coupling reactions; and/or
  (vii) catalytic Heck coupling reactions, especially for the preparation of arylated olefins, and Sonogashira coupling reactions, especially for the preparation of arylated and alkenylated alkynes.

In addition, the metal complexes may be palladium allyl complexes having the structure (V) or palladium aryl complexes having the structure (VI):

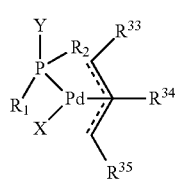
(V)

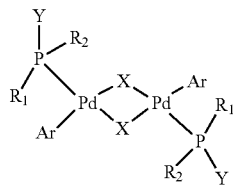
(VI)

wherein X is an anion,

Y, $R^1$, $R^2$ may be defined as in the preceding items, $R^{33}$, $R^{34}$ and $R^{35}$ may be independently selected from H, alkyl, aryl and heteroaryl groups that may be unsubstituted or substituted with functional groups; or at least two of $R^{33}$, $R^{34}$ and $R^{35}$ form a carbocyclic ring with 5 to 14 carbon atoms, Ar represents a substituted or unsubstituted, especially a substituted, aryl group.

Thus, $R^{33}$, $R^{34}$ and $R^{35}$ may be independently selected from linear, branched-chain or cyclic $C_{1-10}$ alkyl groups, preferably from $C_{1-6}$ alkyl groups or $C_{4-10}$-cycloalkyl groups, the aryl groups are selected from $C_{6-14}$ aryl groups, preferably from $C_{6-10}$ aryl groups, the alkenyl groups are selected from mono- or polyunsaturated linear, branched-chain or cyclic $C_{2-10}$ alkenyl groups, preferably from $C_{2-6}$ alkenyl groups, and the heteroaryl groups are selected from $C_{6-14}$ heteroaryl groups, preferably from $C_{6-10}$ heteroaryl groups having 1 to 5 heteroatoms selected from N, O and S, wherein all of the groups mentioned above may be substituted with functional groups; and/or at least two of $R^{33}$, $R^{34}$ and $R^{35}$ form a carbocyclic ring that is a $C_{4-10}$ cycloalkyl group, or a $C_{6-14}$ aryl group, which may be substituted with one or more functional groups; and Ar are selected from $C_{6-14}$ aryl groups, preferably $C_{6-10}$ aryl groups, and the heteroaryl groups are selected from $C_{6-14}$ heteroaryl groups, preferably from $C_{6-10}$ heteroaryl groups having 1 to 5 heteroatoms selected from N, O and S, wherein all of the groups mentioned above may be substituted with functional groups; and the functional groups are selected from alkyl (—$R^{11}$), especially $C_{1-6}$ alkyl groups, $C_{6-10}$ aryl (—$R^{12}$), halogen (—Hal), hydroxy (—OH), cyano (—CN), alkoxy (—$OR^3$), amino (—$NR^{11}_2$, —$NHR^{11}$, —$NH_2$), mercapto (—SH, —$SR^{11}$), wherein $R^{11}$, independently of further $R^{11}$ residues, is selected from $C_{1-6}$ alkyl residues.

In particular, X may be selected from the group of halogen, tosylate, nosylate and mesylate, especially X may be selected from the group of fluorine, chlorine, bromine, iodine, tosylate, nosylate and mesylate, and/or aryl may be selected from phenyl, m-tolyl, p-tolyl, o-tolyl, mesityl, 1,3-diisopropylphenyl.

Palladium complexes containing at least one of the phosphane ligands described above, especially the palladium allyl complexes and palladium aryl complexes may be employed in homogeneous catalysis, especially in coupling reactions, wherein said coupling reaction may be selected from the group consisting of
  (i) catalytic hydrofunctionalization reactions of alkynes and alkenes;
  (ii) catalytic hydroamination reactions of alkynes and alkenes;
  (iii) catalytic O—H addition reactions to alkynes and alkenes;
  (iv) catalytic coupling reactions;

(v) catalytic Suzuki coupling reactions, especially for the preparation of biaryls;
(vi) catalytic cross-coupling reactions, especially C—N and C—O coupling reactions; and/or
(vii) catalytic Heck coupling reactions, especially for the preparation of arylated olefins, and Sonogashira coupling reactions, especially for the preparation of arylated and alkenylated alkynes.

In addition, the patent application relates to a process for performing a coupling reaction containing the steps of
providing a reaction mixture containing at least a substrate, coupling partner, and at least one of the above metal complexes, or a metal complex containing one of the above described ligands; and
reacting said substrate with said coupling partner in the presence of the metal complex or its derivative to form a coupling product.

Here too, the metal of the metal complex as described above may be a precious metal and/or a transition metal, especially a metal of group 10 or 11 of the Periodic Table of the elements, where it has proven useful if the metal of the metal complex is selected from the group consisting of copper, silver, gold, platinum, palladium, nickel, and combinations thereof.

The substrate may be a substituted aromatic compound, and in particular, the substituted aromatic compound may be an aromatic or heteroaromatic compound. It may be substituted, inter alia, with a leaving group, or an unsaturated aliphatic group, or a leaving group, where it has proven useful if said leaving group is selected from the group consisting of halogen, tosylate, nosylate and mesylate, and/or said unsaturated aliphatic group is selected from the group consisting of alkene or alkyne, especially with 2 to 12, especially with 2 to 8, carbon atoms.

The coupling partner may comprise an organometallic compound, especially which may be selected from the group consisting of organic boron compounds, organolithium compounds, organozinc compounds, organolithium compounds, and Grignard compounds, wherein advantageously said organometallic compound includes at least one aromatic residue, or wherein said organometallic compound includes at least one unsaturated aliphatic residue, or wherein said organometallic compound includes at least one saturated aliphatic residue.

Also, the patent application relates to such a process wherein the coupling reaction is selected from the group consisting of
(i) catalytic hydrofunctionalization reactions of alkynes and alkenes;
(ii) catalytic hydroamination reactions of alkynes and alkenes;
(iii) catalytic O—H addition reactions to alkynes and alkenes;
(iv) catalytic coupling reactions;
(v) catalytic Suzuki coupling reactions, especially for the preparation of biaryls;
(vi) catalytic cross-coupling reactions, especially C—N and C—O coupling reactions; and/or
(vii) catalytic Heck coupling reactions, especially for the preparation of arylated olefins, and Sonogashira coupling reactions, especially for the preparation of arylated and alkenylated alkynes.

The invention is further explained by means of the following Examples. They are exemplary for the preparation of the ylide-functionalized phosphanes, their transition metal complexes, and the use thereof in catalysis, and they are by no means to be understood as limiting the scope of protection of the invention.

EXAMPLES

Example 1: Preparation of Ylide-functionalized Phosphanes

A) Preparation Through Metallated Ylides with Monochlorophosphanes (Route a)

Preparation of the ylide-functionalized bis(cyclohexyl) phosphane with On=PPh$_3$, R=R'=Cy, X=SO$_2$Tol from the metallated ylide [Ph$_3$PCSO$_2$Tol]Na

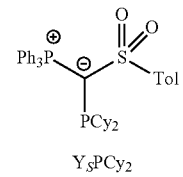

Y$_S$PCy$_2$ 2.05 g (4.5 mmol) of the metallated ylide [Ph$_3$PCSO$_2$Tol]Na was dissolved in 40 ml of THF and cooled down to 50° C. At this temperature, 1.13 ml (5.4 mmol) of dicyclohexylchlorophosphanes was slowly added to the yellow reaction solution, which finally bleached when warmed up to room temperature. After the solvent has been removed under vacuum, the colorless solid formed was taken up in 30 ml of toluene, and the suspension was filtered. Renewed reduction of the solvent resulted in the formation of a solid. The latter was filtered off, whereby the product could be obtained as a colorless solid (yield: 1.97 g, 3.2 mmol, 71%).

$^1$H-NMR (250 MHz, THF-d$^8$): δ=0.78-1.29 (m, 10H, CH$_{Cy}$), 1.47-1.79 (m, 10H, CH$_{Cy}$), 2.13-2.23 (m, 2H, CH$_{Cy}$), 2.31 (s, 3H, CH$_{STol}$), 6.90-7.10 (m, 4H, CH$_{STol}$, meta/ortho), 7.35-7.61 (m, 9H, CH$_{PPh}$, meta/para), 7.65-7.78 (m, 6H, CH$_{PPh}$, ortho). $^{31}$P{$^1$H}-NMR (250 MHz, THF-d$^8$): δ=−5.79 (d, $^2J_{PP}$=164.3 Hz: PCy), 25.58 (d, $^2J_{PP}$=164.4 Hz; PPh$_3$). TEP=2055.1 cm$^{-1}$.

The preparation of the simple ylide-functionalized phosphanes was also effected according to this protocol, with:
On=PPh$_3$, X=SO$_2$Tol, R=R'=Ph (T. Scherpf et al., Angew. Chem. Int. Ed., 54, 8542 (2015)), iPr, adamantyl or cyclohexyl
On=PPh$_3$, X=CN, R=R'=Ph, or Cy.

In addition, the bis(ylide)-functionalized phosphane Y$_2$PPh with On=PPh$_3$ and X=CN was prepared according to this protocol.

B) Preparation Through the Dichlorophosphane Intermediate (Route a)

Preparation of the ylide-functionalized dimethylphosphane with On=PPh$_3$, R=R'=Me, X=SO$_2$Tol from the metallated ylide [Ph$_3$PCSO$_2$Tol]Na

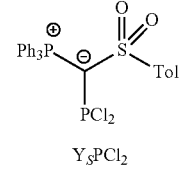

Y$_S$PCl$_2$

In a 50 ml Schlenk tube, 3.01 g (6.66 mmol) of the metallated ylide was dissolved in 35 ml of THF. Thereafter, 0.70 ml (1.10 g, 7.99 mmol) of phosphorus trichloride was quickly added dropwise and heated to boil for 5 min. After the reaction solution had been stirred over night, the solvent was removed under vacuum, and the solid was dissolved in dichloromethane. Subsequently, the suspension was filtered through a filter cannula, and the solvent was again removed under vacuum. The solid that had precipitated was washed with benzene, filtered off through a Schlenk frit, and dried under vacuum. The ylide-functionalized dichlorophosphane can thus be obtained as a colorless solid (yield: 2.88 g, 5.44 mmol, 82%).

$^1$H-NMR (500.1 MHz, CD$_2$Cl$_2$): δ [ppm]=2.37 (s, 3 H; CH$_3$), 7.04-7.07 (m, 2 H; CH$_{Tol,meta}$), 7.22-7.25 (m, 2 H; CH$_{Tol,ortho}$), 7.49-7.55 (m, 6 H; CHP$_{PPh,meta}$), 7.64-7.69 (m, 3 H; CH$_{PPh,para}$), 7.71-7.77 (m, 6 H; CH$_{PPh,ortho}$). $^{13}$C{$^1$H}-NMR (125.8 MHz, CD$_2$Cl$_2$): δ [ppm]=21.5 (5, CH$_3$), 62.9 (dd, $^1J_{CP}$=111.8 Hz, $^1J_{CP}$=91.8 Hz; C$_{PCS}$), 124.1 (dd, 1 J$_{CP}$=92.8 Hz, $^3J_{CP}$=3.6 Hz; C$_{PPh,ipso}$), 129.1 (5, CH$_{Tol,meta}$), 129.2 (d, $^3J_{CP}$=12.8 Hz; CH$_{PPh,meta}$), 129.7 (d, $^4J_{CP}$=1.9 Hz; CH$_{Tol,ortho}$), 133.5 (d, $^4J_{CP}$=2.9 Hz; CH$_{PPh,para}$), 135.2 (dd, $^2J_{CP}$=10.2 Hz, $^4J_{CP}$=1.9 Hz; CH$_{PPh,ortho}$), 142.4 (s, C$_{Tol,para}$) 143.9 (s, C$_{Tol,ipso}$). $^{31}$P{$^1$H}-NMR (162.0 MHz, CD$_2$Cl$_2$): δ [ppm]=19.7 (d, $^2J_{PP}$=110.1 Hz), 159.2 (br).

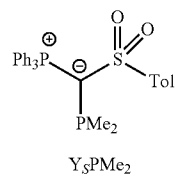

Y$_S$PMe$_2$

In a 50 ml Schlenk tube, 299 mg (0.56 mmol) of the ylide-functionalized dichlorophosphane was dissolved in 10 ml of THF, and 2.35 ml (1.13 mmol, 0.48 M) of methyllithium in THF was slowly added. After stirring the solution over night, the solvent was removed under vacuum, and the residue was dissolved in 15 ml of benzene. Thereafter, the suspension was filtered through a filter cannula, and the solvent was again removed under vacuum. After vacuum drying, the dimethylphosphane can be isolated as a colorless solid (0.38 g, 0.78 mmol; 82%).

$^1$H-NMR (500.1 MHz, C$_6$D$_6$): δ [ppm]=1.70 (5,6 H; CH$_{3,PMe}$), 1.96 (5,3 H; CH$_{3,Tol}$), 6.74-6.75 (m, 2 H; CH$_{Tol,meta}$), 6.96-6.99 (m, 6 H; CH$_{PPh,meta}$), 7.03-7.05 (m, 3 H; CH$_{PPh,para}$), 7.59-7.60 (m, 2 H; CH$_{Tol,ortho}$), 7.75-7.77 (m, 6 H; CH$_{PPh,ortho}$). $^{13}$C{$^1$H}-NMR (125.8 MHz, C$_6$D$_6$): δ [ppm]=16.0 (dd, $^1J_{CP}$=13.9 Hz, $^3J_{CP}$=6.5 Hz; CH$_{3,PMe}$), 21.1 (5, CH$_{3,Tol}$), 42.2 (dd, $^1J_{CP}$=107.8 Hz, $^1J_{CP}$=53.7 Hz; C$_{PCS}$), 126.9 (s, CH$_{Tol,ortho}$), 128.3 (d, $^3J_{CP}$=12.0 Hz; CH$_{PPh,meta}$), 128.6 (5, CH$_{Tol,meta}$), 131.7 (d, $^4J_{CP}$=2.8 Hz; CH$_{PPh,para}$), 135.0 (dd, $^2J_{CP}$=9.5 Hz, $^4J_{CP}$=2.5 Hz; CH$_{PPh,ortho}$), 139.8 (5, C$_{Tol,para}$), 148.5 (s, C$_{Tol,ipso}$). $^{31}$P{$^1$H}-NMR (162.0 MHz, C$_6$D$_6$): δ [ppm]=−46.4 (d, $^2J_{PP}$=146.5 Hz), 23.6 (d, $^2J_{PP}$=146.5 Hz). TEP=2059.7 cm$^{-1}$.

The preparation of the simple ylide-functionalized phosphanes with On=PPh$_3$, X=SO$_2$Tol or CN, R=R'=Ph, Me, iPr or Cy was effected according to this protocol.

In addition, the ylide-functionalized phosphane Y$_2$PCy with On=PPh$_3$ and X=CN was prepared according to this protocol.

C) Preparation by Phosphorylation and Deprotonation of Onium Salts (Route B)

The corresponding onium salts are either commercially available, or can be prepared by standard synthesis methods, such as the quaternization of corresponding phosphane, sulfide or amine precursors with alkyl halides and tosylates. The salts (such as A in the following Scheme) can be deprotonated with metal bases, such as potassium tert-butanolate, metal hydrides or lithium/sodium/potassium bis (trimethylsilyl)amide, and directly react with the halophosphane to form the phosphanyl-substituted onium salt (e.g., B). The latter can be converted to the desired ylide-functionalized phosphane with another equivalent of base without prior processing. Simple representatives can be obtained from the commercially available bis(diphenylphosphino)methane and bis(dicyclohexylphosphino)methane by quaternization with alkyl halides followed by deprotonation (J. Langer et al., ARKIVOC, 3, 210 (2012)). Other functionalizations can be realized according to the following Scheme. In particular, phosphanes, sulfides, amines, imines, N-heterocycles and sulfoxides have proven useful as the On moiety.

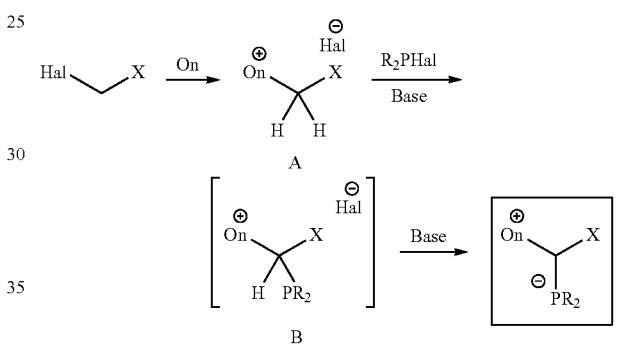

D) Examples: Synthesis of a Methyl-(Z=Me) and Silyl-Functionalized (Z=SiMe$_3$) Ylide Phosphane The onium salt A (here: ethyltriphenylphosphonium iodide) with X=Me and Hal=I can be prepared according to known literature protocols (M. N. Alberti et al., Org. Lett., 10, 2465 (2008)), or can be purchased (CAS: 4736-60-1). The formation of the ylide-functionalized phosphane Y$_{Me}$PCy$_2$ with R=Cy is effected in accordance with:

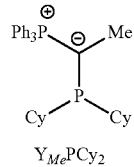

Y$_{Me}$PCy$_2$ 190 g (4.50 mmol) of ethyltriphenylphosphonium iodide and 500 mg (12.5 mmol) of potassium hydride were added to 20 ml of THF. The suspension was heated at 60° C. for 4 hours, whereupon formation of hydrogen could not be observed any more. Subsequently, 1.60 g (5.0 mmol) of dicyclohexyliodophosphane was added dropwise, and the mixture was again heated at 60° C. for 16 hours. After the solvent had been removed under vacuum, 20 ml of hexane was added. The mixture was heated to the boiling point and filtered while still hot. The solvent was again removed under vacuum, and the residual solid was dissolved in as low as possible an amount of a 1:1 mixture of hexane and toluene. By storing the solution at −75° C. for three days, the desired phosphane could be isolated as an orange crystalline solid (1.63 g, 3.35 mmol, 74%).

$^1$H NMR: (400.1 MHz, CD$_2$Cl$_2$): δ=1.20-1.59 (m, 10H, Cy), 1.70-1.89 (m, 6H, Cy), 1.89-2.07 (m, 4H, Cy), 2.11 (dd, 3H, $^3J_{HP}$=16.3 Hz, $^3J_{HP}$=2.4 Hz, CH$_3$), 2.21-2.30 (m, 2H, Cy), 7.05-7.10 (m, 9H, CH$_{PPh,ortho}$ and CH$_{PPh,para}$), 7.69-7.79 (m, 6H, CH$_{PPh,meta}$), $^{31}$P{$^1$H}-NMR: (162.1 MHz, CD$_2$Cl$_2$): δ=−2.44 (d, $^2J_{PP}$=176.8 Hz, PCy$_2$), 25.4 (d, $^2J_{PP}$=176.8 Hz, PPh$_3$). TEP: 2050.1 cm$^{-1}$.

The preparation of the ylide-functionalized phosphanes with On=PPh$_3$, X=Et, CH$_2$Ph, Cy, SiMe$_3$, R=R'=Ph, Me or Cy was also effected according to this protocol.

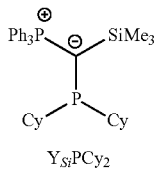

Y$_{Si}$PCy$_2$ 2.00 g (4.20 mmol) of trimethylsilylmethylenephenylphosphonium iodide and 250 mg (6.23 mmol) of potassium hydride were added to 20 ml of THF. The suspension was stirred at room temperature for 16 hours, whereupon formation of hydrogen could not be observed any more. The yellow suspension was filtered, washed with 5 ml of THF, and transferred into a dropping funnel, and slowly added to a solution of dicyclohexyliodophosphane (1.5 g, 4.63 mmol) in 20 ml of toluene at −78° C. The solution was slowly heated to room temperature and then stirred for 24 h. The solid that had precipitated was filtered off and washed twice with 5 ml of toluene, and dried under vacuum. The solid and 670 mg of KHMDS (3.36 mmol) were dissolved in 20 ml of THF and stirred for 1 hour. The solid that had precipitated was removed by filtration, the solvent was removed under vacuum, and the residual solid was dissolved in 50 ml boiling hexane and filtered while still hot. The solution was slowly cooled down to RT and allowed to stand for 16 hours. The solution above the yellow crystals that had formed was removed, and the crystals were washed three times with 5 ml of cold hexane, followed by drying under vacuum (1.07 g, 1.98 mmol, 47%).

$^1$H NMR: (400.1 MHz, C$_6$D$_6$): δ=0.28 (s, 6.3 H, SiMe$_3$, trans), 0.40 (s, 2.7 H, SiMe$_3$, cis), 0.89-2.25 (m, 20H, Cy), 2.34-2.60 (m, 2H, Cy), 7.02-7.11 (m, 9H, CH$_{PPh,ortho}$ and CH$_{PPh,para}$), 7.73-7.82(m, 6H, CH$_{PPh,meta}$), $^{31}$P{$^1$H}_NMR: (162.1 MHz, C$_6$D$_6$): δ=8.3 (d, $^2J_{PP}$=37.2 Hz, PCy$_2$, cis), 12.8 (d, $^2J_{PP}$=172.2 Hz, PCy$_2$, trans), 19.7 (d, $^2J_{PP}$=37.2 Hz, PPh$_3$, cis), 29.1 (d, $^2J_{PP}$=172.2 Hz, PPh3, trans), TEP: 2048.9 cm$^{-1}$.

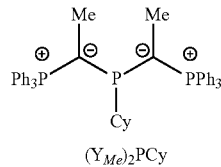

(Y$_{Me}$)$_2$PCy 4.00 g (10 mmol) of ethyltriphenylphosphonium iodide and 600 mg (15 mmol) of potassium hydride were added to 20 ml of THF. The suspension was stirred at room temperature for 16 hours, whereupon formation of hydrogen could not be observed any more. The red suspension was filtered, washed with 5 ml of THF, and transferred into a dropping funnel, and slowly added dropwise to a solution of cyclohexyldichlorophosphane (460 mg, 2.5 mmol) in 20 ml of THF with vigorous stirring. The solution was stirred at RT for 16 hours. The solid that had precipitated was filtered off and washed twice with 10 ml of THF. The solvent of the red solution obtained was removed under vacuum, and the solid obtained was dried under vacuum. 20 ml of cyclohexane was added, the mixture was heated to boil, filtered while still hot, and then slowly cooled down to RT, wherein a red solid precipitated. The supernatant solution was removed, and the solid was washed twice with 2 ml of pentane and dried under vacuum (0.68 g, 0.98 mmol, 39%).

$^1$H NMR: (400.1 MHz, C$_6$D$_6$): δ=1.17-1.36 (m, 3H, Cy,), 1.47-1.60 (m, 2H, Cy,), 1.70-1.80 (m, 1H, Cy,), 1.84-1.94 (m, 2H, Cy,), 2.22-2.32 (m, 2H, Cy), 2.52 (dd, $^3J_{HP}$=17.4 Hz, $^3J_{HP}$=2.0 Hz 6H, Me), 2.75-2.86 (m, 1H, Cy), 7.98-7.04 (m, 12H, CH$_{PPh,ortho}$), 7.04-7.11 (m, 6H, CH$_{PPh,para}$), 7.62-7.70 (m, 12H, CH$_{PPh,meta}$), $^{31}$P{$^1$H}-NMR: (162.1 MHz, C$_6$D$_6$): δ=−20.3 (t, $^2J_{PP}$=175.1 Hz, PCy), 19.5 (d, $^2J_{PP}$=175.1 Hz, PPh$_3$)

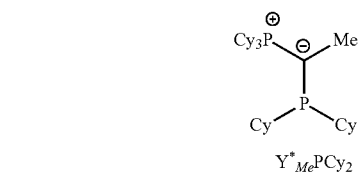

Y*$_{Me}$PCy$_2$

In a Schlenk flask, 10.0 g (22.9 mmol) of ethyltricyclohexylphosphonium iodide was suspended in 75 ml of THF. The Suspension was cooled in an ice bath to 0° C., 14.5 ml (22.9 mmol) of a 1.58 M solution of n-BuLi in hexanes was slowly added dropwise. The solution, which was clear now, was warmed up to room temperature, and 2.45 ml (2.67 g, 11.5 mmol) of dicyclohexylphosphane chloride was added. A colorless solid precipitated immediately, and the suspension was heated at 60° C. for 16 hours. The colorless solid was filtered off and washed twice with 20 ml each of THF, and stored under argon. The filtrate was dried under vacuum, and the resulting solid was dissolved in 100 ml of cyclohexane, filtered, and the cyclohexane was again removed under vacuum. After drying under vacuum, the product could be isolated as a colorless solid (4.93 g, 9.77 mmol, 85%).

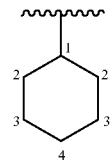

Numbering Scheme $^1$H NMR (400 MHz, C$_6$D$_6$) δ=1.08-1.23 (m, 9H, CH$_{2,PCy3,H3+H4}$), 1.32-1.43 (m, 2H, CH$_{2,PCy2,H4}$), 1.43-1.58 (m, 12H, CH$_{2,PCy3,H2+PCy2,H2+H3}$), 1.58-1.66 (m, 5H, CH$_{2,PCy3,H4+PCy2,H2}$), 1.67-1.79 (m, 6H, CH$_{2,PCy3,H3}$), 1.76-1.83 (m, 2H, CH$_{2,PCy2,H4}$), 1.82-1.96 (m, 11H, CH$_{2,PCy3,H2+PCy2,H2+}$CH$_3$), 1.95-2.09 (m, 4H, CH$_{2,PCy3,H3+}$CH$_{,PCy2,H1}$), 2.11-2.23 (m, 2H, CH$_{2,PCy2,H2}$), 2.23-2.34 (m, 2H, CH$_{2,PCy2,H3}$), 2.34-2.52 (m, 3H, CH,$_{PCy3,H1}$) ppm. $^{13}$C {$^1$H} NMR (101 MHz, C$_6$D$_6$) δ=−1.7 (dd, $^1$J$_{CP}$=108.8 Hz, $^1$J$_{CP}$=21.1 Hz, P-C-P), 14.8 (dd, $^2$J$_{CP}$=8.4 Hz, $^2$J$_{CP}$=0.7 Hz, CH$_3$), 26.6-27.0 (m, CH$_{2,PCy3,C4}$), 27.7-27.8 (m, CH$_{2,PCy2,C4}$), 27.8 (d, $^3$J$_{CP}$=11.0 Hz, CH$_{2,PCy3,C3}$), 28.0-28.4 (m, CH$_{2,PCy3,C2}$), 28.5 (d, $^3$J$_{CP}$=11.8 Hz, CH$_{2,PCy2,C3}$), 29.0 (d, $^3$J$_{CP}$=8.1 Hz, CH$_{2,PCy2,C3}$), 32.9 (d, $^2$J$_{CP}$=9.9 Hz, CH$_{2,PCy2,C2}$), 33.67 (dd, $^1$J$_{CP}$=49.5 Hz, $^3$J$_{CP}$=8.9 Hz, CH,$_{PCy3,C1}$) 33.69 (d, $^2$J$_{CP}$=19.8 Hz, CH$_{2,PCy2,C2}$), 38.4 (dd, $^1$J$_{CP}$=13.8 Hz, $^3$J$_{CP}$=5.3 Hz, CH,$_{PCy2,C1}$) ppm. $^{31}$P {$^1$H} NMR (162 MHz, C$_6$D$_6$) δ=1.0 (d, $^2$J$_{PP}$=128.9 Hz, PCy$_2$), 30.6 (d, $^2$J$_{PP}$=128.9 Hz, PCy3) ppm. CHNS: calculated: C: 76.14, H: 11.58. measured: C: 75.62, H: 11.32.

Recovery of Ethyltricyclohexylphosphonium Iodide

The colorless solid remaining after the washing with THF was dried under vacuum and dissolved in 15 ml of DCM. The solution was filtered, and the solvent was removed under vacuum, and dried. Ethyltricyclohexylphosphonium iodide was obtained as a colorless solid (4.27 g, 9.8 mmol, 85%).

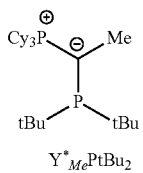

Y*$_{Me}$PtBu$_2$

In a Schlenk flask, 2.55 g (5.84 mmol) of ethyltricyclohexylphosphonium iodide was suspended in 25 ml of THF. The suspension was cooled in an ice bath to 0° C., and 2.78 ml (5.84 mmol) of a 2.1 M solution of n-BuLi in hexanes was slowly added dropwise. The solution, which was clear now, was warmed up to room temperature. 0.55 ml (0.53 g, 2.92 mmol) of di-tert-butylchlorophosphane was added, and the mixture was heated at 60° C. for 16 hours. The colorless solid was filtered off and washed twice with 5 ml each of THF. The filtrate was dried under vacuum, and the resulting solid was dissolved in 50 ml of cyclohexane. After renewed filtration, the solvent was removed under vacuum, and the product was isolated as a colorless solid (1.32 g, 1.51 mmol, 52%; non-optimized yield).

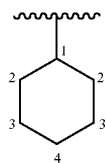

$^1$H NMR (400 MHz, C$_6$D$_6$) δ=1.08-1.24 (m, 9H, CH$_{2,Cy,H3+H4}$), 1.54 (d, $^3$JHP=10.7 Hz, 18H, CH3, tBu), 1.44-1.67 (m, 9H, CH$_{2,Cy,H2+H4}$), 1.63-1.76 (m, 6H, CH$_{2,Cy,H3}$), 2.04 (d, $^3$J$_{PH}$=13.0 Hz, 6H, CH$_{2,Cy,H2}$), 2.11 (dd, $^3$J$_{HP}$=13.8 Hz, $^3$J$_{HP}$=3.1 Hz, 3H, CH$_3$), 2.16-2.32 (m, 3H, CH,$_{Cy,H1}$) ppm. $^{13}$C {$^1$H} NMR (101 MHz, C$_6$D$_6$) δ=4.5 (dd, $^1$J$_{CP}$=102.9 Hz, $^1$J$_{CP}$=27.3 Hz, P-C-P), 18.2 (dd, $^2$J$_{CP}$=8.6 Hz, $^2$J$_{CP}$=0.6 Hz, CH$_3$), 27.0 (CH$_{2,Cy,C4}$), 28.2 (d, $^3$J$_{CP}$=10.6 Hz, CH$_{2,Cy,C3}$), 29.6-29.8 (m, CH$_{2,Cy,C2}$), 33.3 (d, $^2$J$_{CP}$=14.4 Hz, CH3, tBu), 36.5 (dd, $^1$J$_{CP}$=23.4 Hz, $^1$J$_{CP}$=6.6 Hz, C,$_{tBu}$) 37.0 (dd, $^1$J$_{CP}$=47.9 Hz, $^3$J$_{CP}$=9.0 Hz, CH,$_{Cy,C1}$) ppm. $^{31}$P {$^1$H} NMR (162 MHz, C$_6$D$_6$) δ=26.4 (d, $^2$J$_{PP}$=146.9 Hz, PtBu$_2$), 30.4 (d, $^2$J$_{PP}$=146.9 Hz, PCy$_3$) ppm.

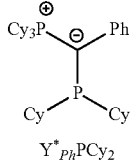

Y*$_{Ph}$PCy$_2$

In a Schlenk tube, 500 mg (1.11 mmol) of benzyltricyclohexylphosphonium iodide was weighed and suspended in 10 mL of THF. To the suspension, 0.51 ml (1.11 mmol; 1 eq.) of an n-BuLi solution (2.18 M in hexane) was slowly added dropwise until a clear solution had formed. The solution was stirred for 45 min, and subsequently 0.32 ml (335 mg; 1.44 mmol; 1.3 eq.) of Cy$_2$PCl was added. The suspension was stirred at room temperature for 16 hours. The solid was filtered off and washed twice with 10 ml each of THF, and dried under high vacuum for 1.5 hours (558 mg). The solid obtained as well as 133 mg (1.19 mmol) of potassium tert-butanolate were weighed in a Schlenk tube and suspended in 20 ml of dry toluene. The suspension was stirred for 16 hours and then filtered off. The solid was washed twice with 10 ml of toluene. The solvent of the filtrate was removed under vacuum, and the product was obtained as a colorless solid (0.35 g, 0.62 mmol, 56%; non-optimized yield).

Numbering Scheme $^1$H NMR (400 MHz, Tol-d$_8$) δ=1.00-1.22 (m, 9H, CH$_{2,PCy3,H3+H4}$), 1.22-1.64 (m, 19H, CH$_{2,PCy2,H2+H3+H4PCy3,H2,H3}$), 1.64-1.83 (m, 12H, CH$_{2,PCy2,H3+H4PCy3,H3}$), 1.83-2.01 (m, 10H, CH$_{2,PCy2,H2PCy3,H2}$), 2.33-2.46 (m, 5H, CH,$_{PCy2,H1,PCy3,H1}$), 6.97—7.00 (m, 1H, CH,$_{Ph,para}$), 7.18-7.25 (m, 2H, CH,$_{Ph,meta}$), 7.34-7.40 (m, 2H, CH,$_{Ph,ortho}$) ppm. $^{31}$P{$^1$H}-NMR (162.1 MHz, Tol-d$_8$): δ[ppm]=−5.4 (d, $^2$J$_{PP}$=132.0 Hz, PtBu$_2$), 21.5 (d, $^2$J$_{PP}$=132.0 Hz,) ppm.

Example 2: Preparation of Transition Metal Complexes of the Ylide-functionalized Phosphanes A) Nickel Carbonyl Complexes By way of example, the synthesis of the complex with the ylide-functionalized phosphane with On=PPh$_3$, R=R'=Me, X=SO$_2$Tol as prepared in Example 1.B) is described below.

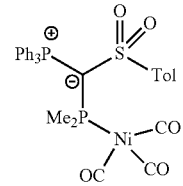

In a 30 ml Schlenk tube, 0.10 g (0.20 mmol) of the phosphane was suspended in 5 ml of pentane. Thereafter, 0.43 ml (0.31 mmol) of 0.7 M nickel tetracarbonyl in benzene was quickly added dropwise, and the reaction mixture was stirred at room temperature for 2 hours. Subsequently, the solvent was removed by means of a cannula, and the solid was washed twice with 5 ml each of pentane. After removing the solvent and drying under vacuum, the complex was obtained as a grayish solid (79.1 mg, 0.13 mmol, 61%).

$^1$H-NMR (500.1 MHz, CD$_2$Cl$_2$): δ[ppm]=1.97 (d, $^2J_{PH}$=4.70 Hz, 6 H; CH$_{3,PMe}$), 2.30 (s, 3H; CH$_{3,Tol}$), 6.93-6.95 (m, 2 H; CH$_{Tol,meta}$), 7.16-7.17 (m, 2 H; CH$_{Tol,ortho}$), 7.38-7.42 (m, 6 H; CH$_{PPh,meta}$), 7.53-7.58 (m, 9 H; CH$_{PPh,ortho+para}$). $^{13}$C{$^1$H}-NMR (125.8 MHz, CD$_2$Cl$_2$): δ[ppm]=21.4 (s, CH$_{3,Tol}$), 23.4 (dd, $^1J_{CP}$=26.8 Hz, $^3J_{CP}$=3.5 Hz; CH$_{3,PMe}$), 39.1 (dd, $^1J_{CP}$=105.6 Hz, $^1J_{CP}$=3.2 Hz; C$_{PCS}$), 125.9 (5, CH$_{Tol,ortho}$), 126.9 (dd, $^1J_{CP}$=91.5 Hz, $^3J_{CP}$=1.9 Hz; C$_{PPh,ipso}$), 128.8 (d, $^3J_{CP}$=12.4 Hz; CH$_{PPh,meta}$), 129.0 (s, CH$_{Tol,meta}$), 132.8 (d, $^4J_{CP}$=3.0 Hz; C$_{PPh,para}$), 135.1 (d, $^2J_{CP}$=9.8 Hz; CH$_{PPh,ortho}$), 140.7 (s, C$_{Tol,para}$), 146.7 (dd, $^3J_{CP}$=1.21 Hz, $^3J_{CP}$=1.2 Hz; CH$_{Tol,ipso}$), 196.2 (s, Cco). $^{31}$P{$^1$H}-NMR (162.0 MHz, CD$_2$Cl$_2$): δ[ppm]=−11.8 (d, $^2J_{PP}$=75.6 Hz), 20.3 (d, $^2J_{PP}$=75.6 Hz). Elemental analysis: measured: C, 58.41; H, 4.51; S, 4.97. calculated: C, 58.80; H, 4.46; S, 5.06.

B) Gold Chloride Complexes

By way of example, the synthesis of the complex with the ylide-functionalized diphenylphosphane with On=PPh$_3$, R=R'=Ph, X=SO$_2$Tol as prepared in Example 1.A) is described below.

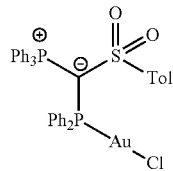

In a 50 ml Schlenk tube, 0.20 g (3.26 mmol) of the phosphane and 0.11 g (3.26 mmol) of (THT)AuCl (THT=tetrahydrothiophene) were dissolved in 5 ml of THF, and the reaction mixture was stirred at room temperature over night to form a colorless precipitate. The solid was filtered off through a Schlenk frit and dried under vacuum to obtain the desired gold complex (0.32 g, 0.38 mmol, 77%).

1 H-NMR (500.1 MHz, CD$_2$Cl$_2$): δ[ppm]=2.27 (s, 3 H; CH$_3$), 6.20-6.23 (m, 2 H; CH$_{Tol,ortho}$), 6.70-6.72 (m, 2 H; CH$_{Tol,meta}$), 7.41-7.51 (m, 12 H; CH$_{PPh,ortho+meta}$), 7.61-7.62 (m, 2 H; CH$_{AuPPh,para}$), 7.63-7.66 (m, 7 H; CH$_{AuPPh,meta+pph,para}$), 7.86-7.90 (m, 4H; CH$_{AuPPh,ortho}$). $^{13}$C{$^1$H}-NMR (125.8 MHz, CD$_2$Cl$_2$): δ [ppm]=21.3 (s, CH$_3$), 42.8 (dd, $^1J_{CP}$=101.4 Hz, $^1J_{CP}$=57.6 Hz; C$_{PCS}$), 126.0 (dd, $^1J_{CP}$=86.9 Hz, $^3J_{CP}$=8.8 Hz; C$_{PPh,ipso}$), 126.0 (s, CH$_{Tol,ortho}$), 128.5 (dd, $^2J_{CP}$=11.7 Hz, $^4J_{CP}$=0.8 Hz; CH$_{PPh,ortho}$), 128.9 (s, CH$_{Tol,meta}$), 129.1 (d, $^3J_{CP}$=12.5 Hz; C$_{PPh,meta}$), 131.1 (d, $^4J_{CP}$=2.6 Hz; CH$_{AuPPh,para}$),133.4 (d, $^4J_{CP}$=2.8 Hz; CH$_{PPh,para}$), 133.4 (dd, $^1J_{CP}$=63.0 Hz, $^3J_{CP}$=8.2 Hz; C$_{AuPPh,ipso}$), 135.2 (d, $^3J_{CP}$=13.6 Hz; CH$_{AuPPh,meta}$), 135.4 (dd, $^2J_{CP}$=9.2 Hz, $^4J_{CP}$=1.2 Hz; CH$_{AuPPh,ortho}$), 141.7 (s, C$_{Tol,para}$), 144.4 (s, CH$_{Tol,ispo}$). $^{31}$P{$^1$H}-NMR (162.0 MHz, CD$_2$Cl$_2$): δ[ppm]=21.4 (d, $^2J_{PP}$=68.3 Hz), 22.1 (d, $^2J_{PP}$=68.3 Hz). Elemental analysis: measured: C, 54.19; H, 3.90; S, 3.68. calculated: C, 53.88; H, 3.81; S, 3.78.

All the gold-phosphane complexes used in the catalysis (see below) were prepared according to this protocol.

C) Palladium Allyl Complexes

By way of example, the synthesis of three palladium allyl complexes of the ylide-substituted phosphanes is described here. Complexes with more ligands other than those stated here can be prepared according to the stated protocol.

Synthesis of the complex with the ylide-functionalized diphenylphosphane with On=PPh$_3$, R=R'=Ph, X=SO$_2$Tol as prepared in Example 1.A):

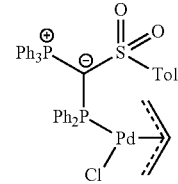

In a 50 ml Schlenk tube, 201 mg 0.325 mmol) of the phosphane and 59 mg (0.163 mmol) of the allylpalladium (II) chloride dimer were dissolved in 10 ml of dichloromethane, and stirred at room temperature for 1 hour. The solvent was subsequently reduced to 1 ml under vacuum, and the mixture was admixed with pentane until a solid precipitated. The latter was filtered off through a Schlenk frit and subsequently dried under vacuum to obtain the palladium complex as a brownish solid (163 mg, 0.21 mmol, 63%).

$^1$H-NMR (500.1 MHz, CD$_2$Cl$_2$): δ [ppm]=1.8-2.5 (br, 2H; CH$_{2,allyl}$), 2.22 (5,3 H; CH$_3$), 2.76 (br, 1 H; CH$_{2,allyl}$), 4.12 (m, 1 H; CH$_{2,allyl}$), 4.84 (br, 1H; CH$_{allyl}$), 6.71-6.73 (m, 2 H; CH$_{Tol,meta}$), 6.76-6.78 (m, 2 H; CH$_{Tol,ortho}$), 7.16-7.18 (m, 4 H; CH$_{PdPPh,meta}$), 7.22-7.25 (m, 2 H; CH$_{PdPPh,para}$), 7.41-7.45 (m, 6 H; CH$_{PPh,meta}$), 7.53-7.57 (m, 3H; CH$_{PPh,para}$), 7.84-7.88 (m, 4H; CH$_{PdPPh,ortho}$), 7.97-8.01 (m, 6H; CH$_{PPh,ortho}$). $^{13}$C{$^1$H}-NMR (125.8 MHz, CD$_2$Cl$_2$): δ [ppm]=21.3 (s, CH$_3$), 42.3 (dd, $^1J_{CP}$=105.2 Hz, $^1J_{CP}$=20.4 Hz; C$_{PCS}$), 64.7 (br; CH$_{2,allyl}$), 78.3 (d, $^2J_{CP}$=31.8 Hz; CH$_{2,allyl}$), 117.7 (d, $^2J_{CP}$=4.3 Hz; CH$_{allyl}$), 126.5 (s, CH$_{Tol,ortho}$), 127.4 (d, $^2J_{CP}$=10.3 Hz; CH$_{PdPPh,meta}$), 128.3 (dd, $^1J_{CP}$=94.0 Hz, $^3J_{CP}$=1.2 Hz; C$_{PPh,ipso}$), 128.4 (dd, $^1J_{CP}$=55.1 Hz, $^3J_{CP}$=12.4 Hz; CH$_{PdPPh,ipso}$), 128.5 (5, CH$_{Tol,meta}$), 128.5 (d, $^3J_{CP}$=12.8 Hz; CH$_{PPh,meta}$), 129.4 (d, $^4J_{CP}$=2.0 Hz; CH$_{PdPPh,para}$), 132.3 (d, $^4J_{CP}$=3.0 Hz; CH$_{PPh,para}$), 135.2 (d, $^2J_{CP}$=10.5 Hz; CH$_{PdPPh,ortho}$), 136.2 (d, $^2J_{CP}$=10.1 Hz; CH$_{PPh,ortho}$), 140.9 (s, C$_{Tol,para}$), 144.2 (s, C$_{Tol,ipso}$). $^{31}$P{$^1$H}-NMR (162.0 MHz, CD$_2$Cl$_2$): δ[ppm]= 9.9 (d, $^2J_{PP}$=67.3 Hz), 22.9 (d, $^2J_{PP}$=67.3 Hz).

Synthesis of the complex with the ylide-functionalized dicyclohexylphosphane with On=PCy$_3$, R=R'=Cy, X=Me as prepared in Example 1.D):

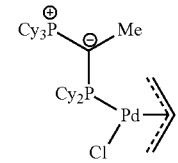

The phosphane Y*$_{Me}$PCy$_2$ (300 mg, 0.60 mmol) and allylpalladium(II) chloride dimer (109 mg, 0.30 mmol) were dissolved in 7 ml of toluene and stirred until a clear solution had formed. Stirring was discontinued, and the solution was stored at room temperature for 3 days. Yellow crystals slowly formed, which were separated from the solvent, then washed three times with 5 ml of pentane, and dried under vacuum (230 mg, 0.33 mmol, 56%; non-optimized yield).

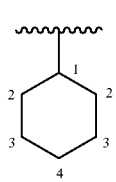 [SMILES: *C1CCCCC1]

Numbering Scheme $^1$H NMR (400 MHz, CD$_2$Cl$_2$) δ=1.12-1.58 (m, 25H, CH$_{2,PCy3+PCy2}$), 1.62 (dd, $^3J_{HP}$=12.4 Hz, $^3J_{HP}$=8.3 Hz, 3H, CH$_3$), 1.67-2.05 (m, 25H, CH$_{2,PCy3+PCy2}$), 2.10-2.24 (m, 2H, CH,$_{PCy2,H1}$), 2.43-3.70 (vbr, 2H, CH$_{2,C3H5}$), 2.54-2.72 (m, 3H, CH,$_{PCy3,H1}$), 3.54 (dd, $^2J_{HH}$=13.7 Hz, $^3J_{HH}$=8.5 Hz, 1H, CH$_{2,C3H5}$), 4.25-4.40 (m, 1H, CH$_{2,C3H5}$), 5.19-5.41 (m, 1H, CH,$_{C3H5}$) ppm. $^{13}$C {$^1$H}NMR (101 MHz, CD$_2$Cl$_2$) δ=-2.7 (dd, $^1J_{CP}$=112.1, $^1J_{CP}$=46.8 Hz, P-C-P), 16.4 (m, CH$_3$), 26.9 (d, $^4J_{CP}$=1.5 Hz, CH$_{2,PCy3,C4}$), 27.2-27.5 (m, CH$_{2,PCy2,C4}$), 27.8 (d, $^3J_{CP}$=13.4 Hz, CH$_{2,PCy2,C3}$), 28.1 (d, $^3J_{CP}$=11.3 Hz, CH$_{2,PCy3,C3}$), 28.60 (d, $^3J_{CP}$=9.9 Hz, CH$_{2,PCy2,C3}$), 28.63 (d, $^2J_{CP}$=2.6 Hz, CH$_{2,PCy3,C2}$), 30.0-30.5 (m, CH$_{2,PCy2,C2}$), 31.2 (d, $^2J_{CP}$=5.2 Hz, CH$_{2,PCy2,C2}$), 32.7-36.6 (m, CH,$_{PCy2,C1}$), 38.4-39.6 (br, CH,$_{PCy3,C1}$), 52.5-52.9 (m, CH$_{2,C3H5}$), 79.5 (d, $^2J_{CP}$=28.4 Hz, CH$_{2,C3H5}$), 114.9 (d, $^2J_{CP}$=4.4 Hz, CH,$_{C3H5}$) ppm. $^{31}$P{$^1$H} NMR (162 MHz, CD$_2$Cl$_2$) δ=20.5 (d, $^2J_{PP}$=63.5 Hz, PCy$_2$), 31.5 (d, $^2J_{PP}$=63.5 Hz, PCy$_3$) ppm. CHNS: calculated: C: 61.13, H: 9.23. measured: C: 61.03, H: 9.34. Synthesis of the complex with the ylide-functionalized phosphane with On=PCy$_3$, R=R'=tBu, X=Me as prepared in Example 1.D):

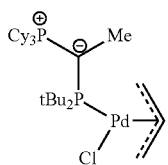

The phosphane Y*$_{Me}$PtBu$_2$ (300 mg, 0.66 mmol) and allylpalladium(II) chloride dimer (115 mg, 0.32 mmol) were dissolved in 10 ml of toluene and stirred at room temperature for 16 hours. An orange solid formed, which was filtered off, washed with 10 ml of toluene and then dried under vacuum (265 mg, 0.42 mmol, 66%).

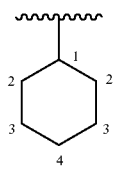 [SMILES: *C1CCCCC1]

Numbering Scheme $^1$H NMR (400 MHz, CD$_2$Cl$_2$) δ=1.02-1.56 (m, 15H, CH$_{2,Cy,H2+H3+H4}$), 1.21 (d, $^3J_{HP}$=13.0 Hz, 9H, CH$_{3,tBu}$), 1.47 (d, $^3J_{HP}$=13.3 Hz, 9H, CH$_{3,tBu}$), 1.57-1.67 (m, 3H, CH$_{2,Cy,H4}$), 1.68-1.89 (m, 9H, CH$_{2,Cy,H3}$+CH$_3$), 1.84-1.99 (br, 3H, CH$_{2,Cy,H2}$), 2.08-2.20 (br, 3H, CH$_{2,Cy,H2}$), 2.69-2.99 (br, 3H, CH,$_{Cy,H1}$), 2.91-3.85 (vbr, 2H, CH$_{2,C3H5}$), 3.56 (dd, $^2J_{HH}$=13.5 Hz, $^3J_{HH}$=8.4 Hz, 1H, CH$_{2,C3H5}$), 4.27-4.35 (m, 1H, CH$_{2,C3H5}$), 5.16-5.62 (m, 1H, CH,$_{C3H5}$). $^{13}$C {$^1$H}NMR (101 MHz, CD$_2$Cl$_2$) δ=4.0 (dd, $^1J_{CP}$=105.1 Hz, $^1J_{CP}$=41.3 Hz, P-C-P), 18.0-19.5 (m, CH$_3$), 26.9 (d, $^4J_{CP}$=1.5 Hz, CH$_{2,PCy3,C4}$), 27.9 (d, $^3J_{CP}$=12.4 Hz, CH$_{2,Cy,C3}$), 28.4 (d, $^3J_{CP}$=11.0 Hz, CH$_{2,Cy,C3}$), 29.0 (CH$_{2,Cy,C2}$), 29.6 (CH$_{2,Cy,C2}$), 31.6 (CH3, tBu), 32.9 (CH3, tBu), 34.4 (d, $^1J_{CP}$=48.1 Hz, CH,$_{Cy,C1}$), 42.0-42.3 (m, C,$_{tBu}$), 56.3 (d, $^2J_{CP}$=2.4 Hz, CH$_{2,C3H5}$), 79.1-79.7 (m, CH$_{2,C3H5}$), 113.7 (CH,$_{C3H5}$) ppm. $^{31}$P {$^1$H} NMR (162 MHz, CD$_2$Cl$_2$) δ=30.8 (d, $^2J_{PP}$=63.4 Hz, PCy$_3$), 58.0 (br, PtBu$_2$) ppm. CHNS: calculated: C: 58.58, H: 9.36. measured: C: 58.85, H: 9.31.

D) Palladium(0) Complexes and their Oxidative Addition Products

By way of example, the synthesis of the palladium dibenzylidene acetone complex with the ylide-functionalized dicyclohexylphosphane with On=PCy$_3$, R=R'=Cy and X=Me as prepared in Example 1.D) is described here. Analogous palladium complexes can be synthesized with other phosphane ligands according to corresponding protocols.

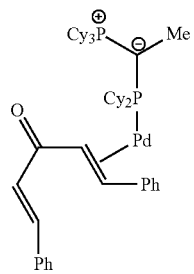

A J. Young NMR tube was filled with 30 mg (59 pmol) of the phosphane Y*$_{Me}$PCy$_2$ and 34 mg (59 µmol) of tris (dibenzylideneacetone)dipalladium(0) x dibenzylideneacetone. Both solids were suspended in 0.6 ml of deuterated THF and shaken for 30 minutes. The reaction was monitored by NMR spectroscopy, and after the reaction was complete, the product was crystallized by slowly diffusing pentane into the THF solution. The product could be obtained in the form of red crystals (45 mg; 53 µmol; 89%). When an excess of phosphane ligand is used, the bisphosphane palladium(0) complex can also be isolated.

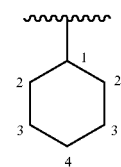

Numbering Scheme $^{31}$P {$^1$H} NMR (162 MHz, THF-d$_8$) δ=26.9 (d, $^2J_{PP}$=82.1 Hz, PCy$_2$), 31.6 (d, $^2J_{PP}$=82.1 Hz, PCy$_3$). $^1$H NMR (400 MHz, THF-d8) δ=1.02-1.86 (m, 50H), 1.53 (dd, $^2J_{HP}$=12.6 Hz, $^2J_{HP}$=7.2 Hz, 3H), 1.87-2.06 (m, 2H, CH,$_{PCy2,H1}$), 2.09-2.32 (m, 3H, CH,$_{PCy3,H1}$), 5.97-6.17 (m, 2H, dba), 6.35-6.73 (m, 2H, dba), 7.10-7.31 (m, 8H, dba), 7.30-7.43 (m, 8H, dba), 7.49-7.63 (m, 4H, dba), 7.63-7.73 (m, 8H, dba), 7.73-7.79 (m, 2H, dba).

By way of example, the synthesis of a palladium(II) arylchlorido complex with the ylide-functionalized dicyclohexylphosphane with On=PCy$_3$, R=R'=Cy and X=Me as prepared in Example 1.D) is described here. Other palladium (II) complexes can be synthesized by analogy with all other phosphane ligands and with further aryl chlorides and bromides.

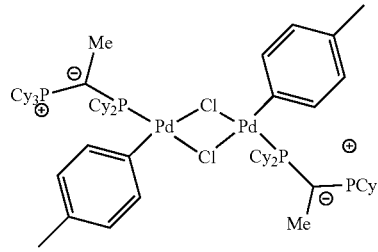

Phosphane Y*$_{Me}$PCy$_2$ (500 mg, 0.99 mmol, 1 eq.) and bis(dibenzylideneacetone)-palladium(0) (742 mg, 1.09 mmol) were stirred at RT in 10 ml of THF for 30 minutes. The solution was filtered, and 1 ml of p-chlorotoluene was added, and the solution was stirred for 48 hours. The dark yellow precipitate was filtered off and washed three times with 10 ml of THF. After drying under vacuum, the product was obtained as a dark yellow solid (515 mg, 0.69 mmol, 70%). The complex proved to be unsoluble in all common solvents except DCM, in which it slowly decomposes, however.

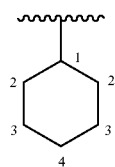 [SMILES: *C1CCCCC1]

Numbering Scheme $^{31}$P {$^1$H} NMR (162 MHz, CD$_2$Cl$_2$) δ=32.5 (d, $^2$J$_{PP}$=49.6 Hz), 35.1 (d, $^2$J$_{PP}$=49.6 Hz) ppm. $^1$H NMR (400 MHz, CD$_2$Cl$_2$) δ=0.95-2.08 (m, 52H, CH+CH$_{2,PCy2+PCy3}$), 1.55 (dd, $^3$J$_{HP}$=12.8 Hz, $^3$J$_{HP}$=9.4 Hz, 3H, CH$_3$), 2.14 (s, 3H, CH$_{3,Tolyl}$), 2.57 (br, 3H,CH,$_{PCy3,H1}$), 6.68 (m, 2H, CH,$_{Tolyl}$), 7.08 (m, 2H, CH,$_{Tolyl}$) ppm.

Example 3: Transition Metal-catalyzed Reactions With Ylide-functionalized Phosphanes A) Gold-Catalyzed Hydroamination of Alkynes For this purpose, the phosphane gold chloride complexes prepared according to the protocol of Example 2B) were dissolved in a 1:1 mixture of alkyne and amine, and one equivalent of sodium tetrakis[3,5-bis(trifluoromethyl)phenyl]borate was added. The mixture was reacted under the conditions as stated in the Table below, in which the following conversion rates and yields were obtained. The catalysis did not show any decrease in yield under aqueous conditions, or upon exposure of the reaction mixture to air.

TABLE 2

Gold(I)-catalyzed hydroamination of phenylacetylene with aniline and ylide- functionalized phosphanes

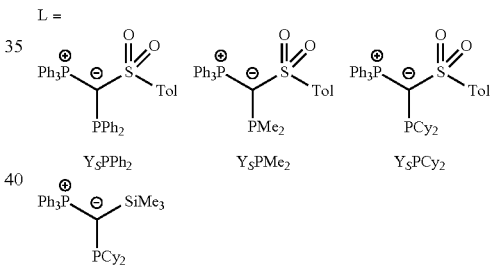

| Charge | Catalyst L•AuCl; L = | Amount of catalyst [mole %] | reaction time [h] | Temp. [° C.] | Yield$^a$ [%] |
|---|---|---|---|---|---|
| 1 | PPh$_3$ | 5 | 18 | RT | 20$^b$ |
| 2 | Y$_S$PPh$_2$ | 5 | 0.25 | RT | 70 |
| 3 | Y$_S$PPh$_2$ | 1 | 0.25 | RT | 63 |
| 4 | Y$_S$PPh$_2$ | 1 | 6 | RT | 99 |
| 5 | Y$_S$PPh$_2$ | 0.1 | 2.5 | 50 | 66 |
| 6 | Y$_S$PPh$_2$ | 0.1 | 5 | 50 | 82 isolated |
| 6 | Y$_S$PPh$_2$ | 0.1 | 14 | 50 | 94 |
| 7 | Y$_S$PPh$_2$ | 0.05 | 22 | 50 | 59 |
| 8 | Y$_S$PPh$_2$ | 0.01 | 22 | 50 | 28 |
| 6 | —$^{[a]}$ | — | 24 | 50 | — |
| 7 | Y$_S$PMe$_2$ | 0.1 | 24 | 50 | 90 |
| 8 | Y$_S$PMe$_2$ | 0.05 | 24 | 50 | 76 |
| 9 | Y$_S$PCy$_2$ | 1 | 0.25 | RT | 98 |
| 10 | Y$_S$PCy$_2$ | 0.1 | 6 | RT | 61 |
| 11 | Y$_S$PCy$_2$ | 0.1 | 22 | RT | 94 |
| 12 | Y$_S$PCy$_2$ | 0.1 | 5 | 50 | 95 |
| 13 | Y$_S$PCy$_2$ | 0.05 | 5 | 50 | 89 |
| 14 | Y$_S$PCy$_2$ | 0.05 | 22 | 50 | 99 |
| 15 | Y$_S$PCy$_2$ | 0.025 | 22 | 50 | 91 |
| 16 | Y$_S$PCy$_2$ | 0.01 | 22 | 50 | 51 |
| 17 | Y$_S$PCy$_2$ | 0.01 | 48 | 50 | 74 |
| 18 | Y$_S$PCy$_2$ | 0.005 | 22 | 80 | 50 |
| 19 | Y$_S$PCy$_2$ | 0.005 | 48 | 80 | 62 |
| 20 | Y$_S$PCy$_2$ | 0.1 | 2 | 50 | 97 |

$^a$The yield was determined by NMR spectroscopy.
$^b$D. Malhotra et al. Angew. Chem. Int. Ed. 53, 4456 (2014).

B) Gold-Catalyzed Intramolecular Addition of O—H to Alkynes

In addition to hydroamination, OH additions to alkynes can also be effected. Thus, 4-pentynoic acid in THF reacts at room temperature with 0.5 mole % Y$_S$PCy$_2$.AuCl and an equimolar amount of sodium tetrakis[3,5-bis(trifluoromethyl)phenyl]borate completely to the desired lactone within 14 hours.

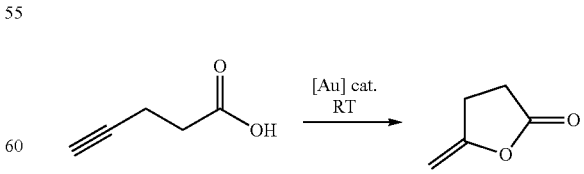

C) Pd-Catalyzed C—N Coupling Reaction

The C—N coupling reaction of amines and haloaromatics was performed with the respective ylide-substituted phosphanes according to known synthesis protocols. The commercially available palladacycle di-p-chlorobis[2'-(amino- N)[1,1'-biphenyl]-2-yl-C]dipalladium(II) was used as a palladium precursor, and reacted with 1 equivalent of the phosphane ligand in THF. With the addition of sodium tert-butanolate, the amine and the bromo- or chloroaromatic were made to react.

the reaction solution were withdrawn and quenched with a little water. The organic phase was taken off, filtered, and the solvent was removed. The residue was dissolved in $CDCl_3$, and the conversion was determined by means of the ratio of product peak to internal standard.

TABLE 3

C—N coupling of phenylaniline with aryl bromides and chlorides with the phosphane ligand $Y_{Me}PCy_2$.

| Charge | Catalyst; Ligand = | Amount of catalyst [mole %] | Aryl halides | Reaction time [h] | Temp, [° C.] | Yield[a] [%] |
|---|---|---|---|---|---|---|
| 1 | $Y_{Me}PCy_2$ | 5 | 2-Bromotoluene | 16 | RT | 99 |
| 2 | $Y_{Me}PCy_2$ | 5 | 4-Chlorobenzonitrile | 16 | RT | 40 |
| 3 | $Y_{Me}PCy_2$ | 5 | 4-Chlorobenzonitrile | 16 | 60 | 95 |
| 4 | $Y_{Me}PCy_2$ | 2.5 | 4-Chlorotoluene | 18 | 100 | 17 |
| 5 | $Y_{Me}PCy_2$ | 2.5 | 4-Chlorotoluene | 48 | 100 | 39 |

"Pd" =

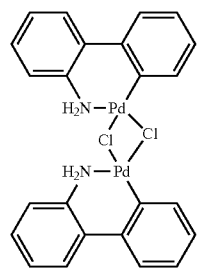

[a] The yield was determined by NMR spectroscopy.

In a glove box, 1.5-2.0 equivalents of potassium tert-butanolate (or sodium tert-butanolate) was added to a screw-cap vessel. Outside the glove box, the aryl chloride (0.9-1.2 mmol) and 1.1 eq. of an amine as well as 2 ml of solvent were added. In a second vessel, a catalyst solution (see below) was prepared, and the corresponding amount of catalyst was added to the reaction. The reaction mixture was stirred at room temperature. After the period as stated in the Table, the reaction was quenched with water, and the product was isolated by column chromatography. Alternatively, yields were determined by NMR spectroscopy. α,α,α-trifluorotoluene in the case of p-fluorochlorobenzene, and 1,3,5-trimethoxybenzene in the case of the fluorine-free chloroaromatics, were used as internal standards. For a determination after defined reaction times, small amounts of In an analogous way, aryl bromides can be employed in the coupling reactions.

Catalyst Preparation:
1) The ligand L1 (or L2-L6) and an equimolar amount of bis(di-benzylideneacetone)palladium(0) (or $Pd(OAc)_2$) were dissolved in THF (or dioxane, or toluene; see Table), and stirred at room temperature for 30 minutes. An appropriate amount of the solution was subsequently added to the reaction vessel.
2) The precatalysts P1, P2, P4—P8 were dissolved in THF and stirred at room temperature for 30 minutes. An appropriate amount of the solution was subsequently added to the reaction vessel.
3) The corresponding amount of precatalyst P3 was directly added to the reaction solution.

Comparison of the catalytic activity of the ligands with known ligand systems

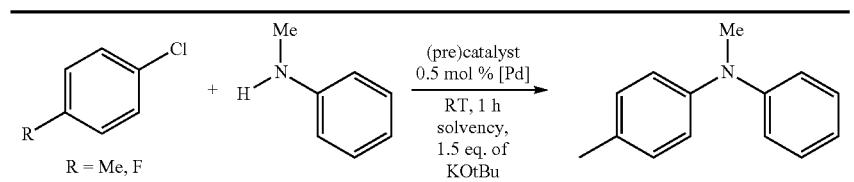

| R | (Pre)catalyst | Base | Solvent | Yield [%][a] |
|---|---|---|---|---|
| Me | L1•Pd₂dba₃ | KOtBu | THF | 95 |
| Me | L1•Pd₂dba₃ | NaOtBu | THF | 52 |
| Me | L1•Pd₂dba₃ | KOtBu | dioxane | 99 |
| F | L1•Pd₂dba₃ | KOtBu | THF | 83 |
| F | L1•Pd₂dba₃ | NaOtBu | THF | 45 |
| F | L1•Pd₂dba₃ | KOtBu | dioxane | 88 |
| F | L1•Pd(OAc)₂ | KOtBu | THF | 87 |
| F | P4 or P5 or P6 or P7 or P8 | KOtBu | THF | <1 |
| F | L3 or L4 or L5 with Pd₂dba₃ | KOtBu | THF | <1 |
| F | L6•Pd(OAc)₂[b] | NaOtBu | toluene | 10 (84)[c] |
| F | L1•Pd(OAc)₂[b] | NaOtBu | toluene | 78 (88)[c] |

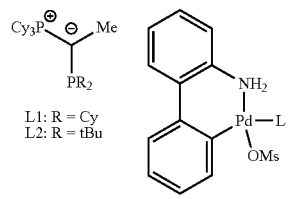

L1: R = Cy
L2: R = tBu

P4: L = RuPhos (L3)
P5: L = BrettPhos (L4)
P6: L = JackiePhos (L5)
P7: L = Ad₂P(nBu) (L7)

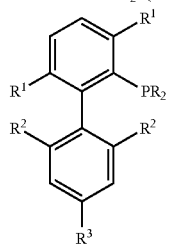

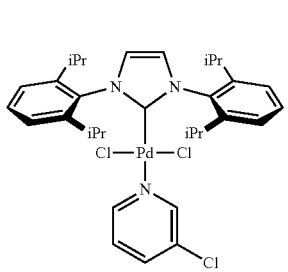

L3: R = Cy, R¹, R³ = H, R² = OiPr
L4: R = Cy, R¹ = OMe, R²,R³ = iPr
L5: R = 3,5-(CF₃)₂C₆H₃, R¹ = OMe, R², R³ = iPr
L6: R = tBu, R¹, R², R³ = H

P8: PEPPSI-IPr

[a]Yields were determined by NMR spectroscopy.
[b]1 mole % of ligand.
[c]After 19 h.

Application of different aryl chlorides with P*$_{Me}$PCy₂ (L1) as ligands

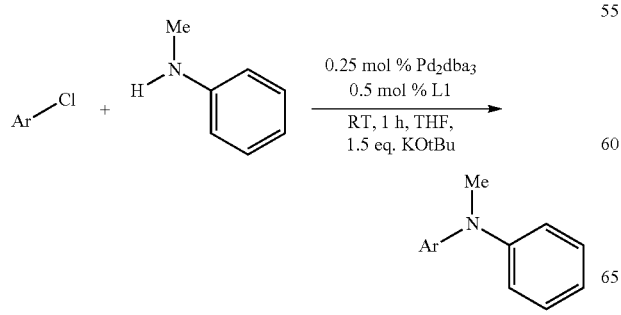

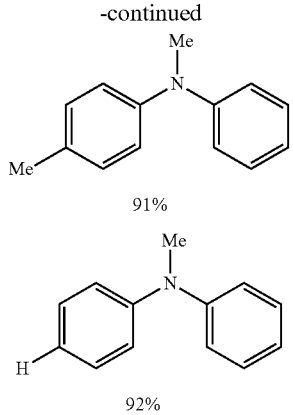

91%

92%

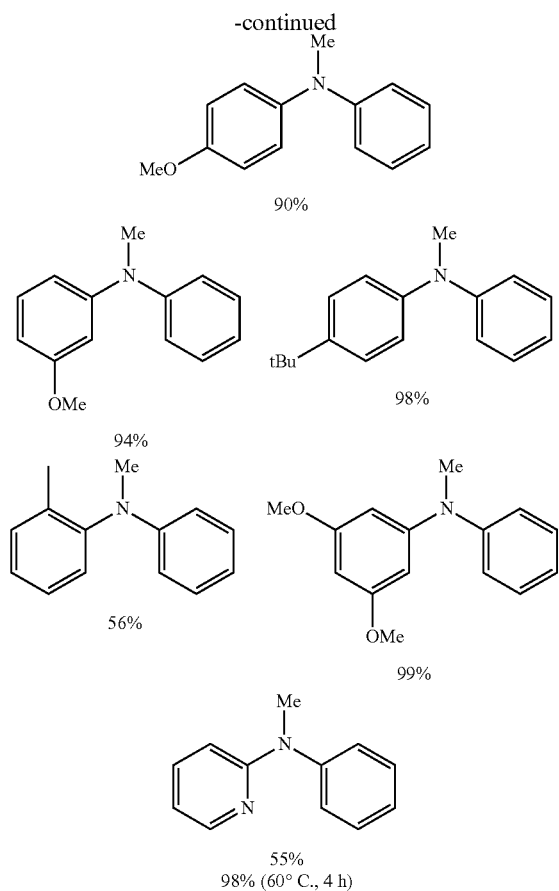

Yields are isolated yields.

Application of different amines and catalyst systems based on P*_{Me}PCy_2 (L1) and P*_{Me}PtBu_2 (L2)

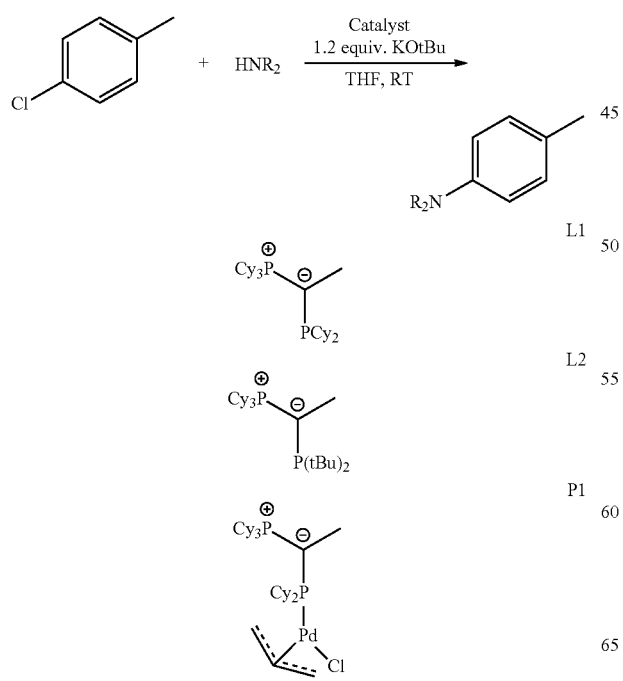

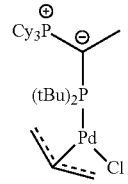

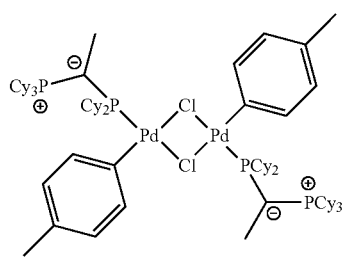

Catalyst: L1.Pd_2dba_3

| Amine | 1 h | 3 h | 6 h | 24 h |
|---|---|---|---|---|
| n-Butylamine | 41% | 49% | 51% | 60% |
| Piperidine | >99% | — | — | — |
| iso-Propylamine | 15% | 20% | 22% | 27% |
| tert-Butylamine | 28% | 83% | >99% | — |
| Diethylamine | 48% | 60% | 67% | 67% |
| N-Methylaniline | >99% | — | — | — |

Catalyst: L2.Pd_2dba_3

| Amine | 1 h | 3 h | 6 h | 24 h |
|---|---|---|---|---|
| n-Butylamine | 53% | 77% | 92% | >99% |
| Piperidine | 10% | 23% | 49% | 63% |
| iso-Propylamine | 17% | 27% | 30% | 43% |
| tert-Butylamine | <1% | 3% | 5% | 9% |
| Diethylamine | <1% | 3% | 5% | 23% |
| N-Methylaniline | 6% | 10% | 15% | 57% |

Catalyst: P1

| Amine | 1 h | 3 h | 6 h | 24 h |
|---|---|---|---|---|
| n-Butylamine | 37% | 44% | 44% | 51% |
| Piperidine | >99% | — | — | — |
| iso-Propylamine | 15% | 17% | 20% | 23% |
| tert-Butylamine | 16% | 21% | 31% | 34% |
| Diethylamine | 50% | 78% | 93% | 98% |
| N-Methylaniline | >99% | — | — | — |

Catalyst: P2

| Amine | 1 h | 3 h | 6 h | 24 h |
|---|---|---|---|---|
| n-Butylamine | >99% | — | — | — |
| Piperidine | >99% | — | — | — |
| iso-Propylamine | 54% | 54% | 57% | 61% |
| tert-Butylamine | 18% | 18% | 19% | 20% |
| Diethylamine | 46% | 54% | 60% | 64% |
| N-Methylaniline | >99% | — | — | — |

Catalyst: P3

| AminE | 1 h | 3 h | 6 h | 24 h |
|---|---|---|---|---|
| n-Butylamine | 44% | 61% | 62% | 64% |
| Piperidine | >99% | — | — | — |
| iso-Propylamine | 13% | 19% | 20% | 25% |
| tert-Butylamine | 37% | >99% | — | — |
| Diethylamine | 61% | 63% | 63% | 68% |
| N-Methylaniline | >99% | — | — | — |

D) Pd-Catalyzed C—C Coupling Reaction

The C—C coupling reaction of boronic acid and haloaromatics was performed with the respective ylide-substituted phosphanes according to known synthesis protocols. The commercially available palladacycle di-p-chlorobis[2'-(amino-N)[1,1'-biphenyl]-2-yl-C]dipalladium(11) was used as a palladium precursor, and reacted with 1 equivalent of the phosphane ligand in THF. With the addition of an aqueous solution of potassium phosphate, the amine and the bromo- or chloroaromatic were made to react.

ml of the thus obtained solution was added to the reaction mixture, and all was stirred at 140° C. for 3 hours. Yields were determined by F-NMR analysis with α,α,α-trifluorotoluene as internal standard.

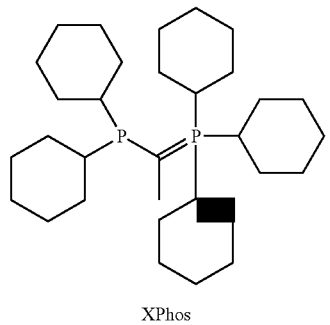

XPhos

TABLE 4

C—C coupling of phenylboronic acid with aryl bromides and chlorides with the phosphene ligands $Y_{Me}PCy_2$ and $YSPCy_2$.

| Charge | Catalyst; Ligand = | Amount of catalyst [mole %] | Aryl halides | Reaction time [h] | Temp. [° C.] | Yield$^a$ [%] |
|---|---|---|---|---|---|---|
| 1 | $Y_SPCy_2$ | 2 | 2-Bromotoluene | 24 | RT | 60 |
| 2 | $Y_{Me}PCy_2$ | 2 | 2-Bromotoluene | 24 | RT | 16 |
| 3 | $Y_{Me}PCy_2$ | 5 | 2-Bromotoluene | 24 | 60 | 99 |
| 4 | $Y_{Me}PCy_2$ | 2 | 4-Bromo-acetophenone | 48 | RT | 84 |
| 5 | $Y_{Me}PCy_2$ | 5 | 4-Chlorotoluene | 24 | 60 | 27 |
| 6 | $Y_{Me}PCy_2$ | 5 | 4-Chlorobenzonitrile | 24 | 60 | 95 |

"Pd" =

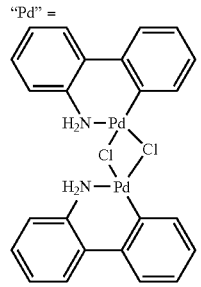

$^a$The yield was determined by NMR spectroscopy.

Heck Reaction with YPhos

In a glove box, potassium carbonate was added to a Schlenk vessel with a stirring rod. 2 ml of dry DMF (dimethylformamide), aryl halide (1.1 mmol) and olefin (2.1 mmol) were added.

A stock solution of catalyst and ligand was prepared by mixing 0.2 mmol palladium acetate $Pd(OAc)_2$ and 0.2 mmol YPhos in a Schlenk vessel. 1 ml of dry THF (tetrahydrofuran) was added, the mixture was stirred for 30 min, and 0.1

-continued

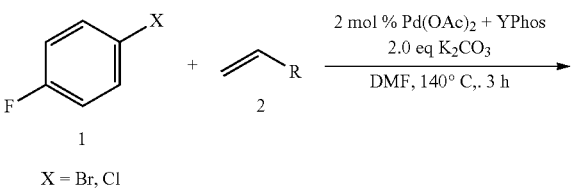

X = Br, Cl

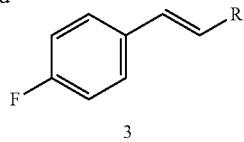

3

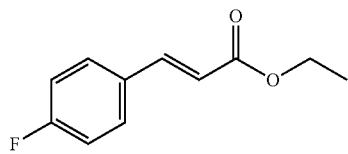

3a 22% (X = Br)
0% (X = Cl)

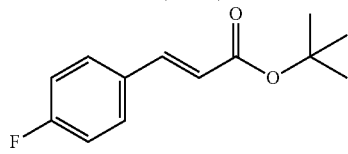

3b 22% (X = Br)

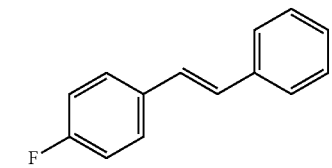

3c 0% (X = Br)

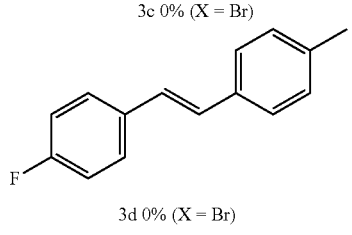

3d 0% (X = Br)

Funding

For the project on which this application is based, grants of the European Research Council (ERC) were provided within the scope of the programme of the European Union for Research and Innovation "Horizon 2020" (Grant Agreement No. 677749).

The invention claimed is:

1. A process for performing a coupling reaction containing the steps of providing a reaction mixture containing at least a substrate, a coupling partner, and a metal complex containing a phosphane ligands of formulas $YPR^1R^2$ (I), $Y_2PR^1$ (II) or $Y_3P$ (III)

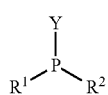

(I)

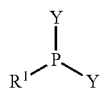

(II)

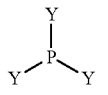

(III)

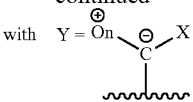

where

Y represents an ylide substituent bound to the phosphorus atom through the carbanionic center and having onium groups On and X groups, On, is phosphonium groups-P $(R^3R^4R^5)$, X, is cyano (—CN), and $R^1$, $R^2$, $R^3$, $R^4$ and $R^5$, if any, are independently selected from alkyl, aryl and heteroaryl groups that may be unsubstituted or substituted with functional groups, and reacting said substrate with said coupling partner in the presence of the metal complex to form a coupling product.

2. The process according to claim 1, wherein the metal of said metal complex is a transition metal.

3. The process according to claim 1, wherein the metal of said metal complex is a metal of group 10 or 11 of the Periodic Table of the elements.

4. The process according to claim 1, wherein the metal of said metal complex is selected from the group consisting of copper, silver, gold, platinum, palladium, nickel, and combinations thereof.

5. The process according to claim 1, wherein the substrate is a substituted aromatic compound.

6. The process according to claim 5, wherein said substituted aromatic compound is an aromatic or heteroaromatic compound.

7. The process according to claim 5, wherein said substituted aromatic compound is substituted with a leaving group, or an unsaturated aliphatic group, or a leaving group.

8. The process according to claim 7, wherein said leaving group is selected from the group consisting of halogen, tosylate, nosylate and mesylate, or said unsaturated aliphatic group is selected from the group consisting of alkene or alkyne.

9. The process according to claim 1, wherein the coupling partner comprises an organometallic compound.

10. The process according to claim 9, wherein said organometallic compound is selected from the group consisting of organic boron compounds, organolithium compounds, organozinc compounds, organolithium compounds, and Grignard compounds.

11. The process according to claim 9, wherein said organometallic compound comprises of at least one aromatic residue.

12. The process according to claim 9, wherein said organometallic compound comprises of at least one unsaturated aliphatic residue.

13. The process according to claim 9, wherein said organometallic compound comprises of at least one saturated aliphatic residue.

14. The process according to claim 1, wherein said complex is a palladium allyl complex having the following structure (V) or (VI):

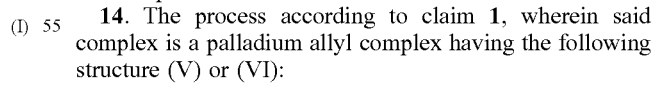

(V)

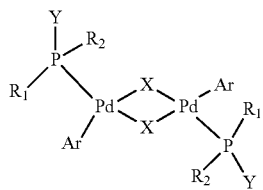

(VI)

wherein X is an anion,

Y, $R^1$, $R^2$ are defined as in claim 1, $R^{33}$, $R^{34}$ and $R^{35}$ are independently selected from H, alkyl, aryl and heteroaryl groups that may be unsubstituted or substituted with functional groups; or at least two of $R^{33}$, $R^{34}$ and $R^{35}$ form a carbocyclic ring with 5 to 14 carbon atoms, Ar represents a substituted or unsubstituted, especially a substituted, aryl group.

15. The process according to claim 14, wherein $R^{33}$, $R^{34}$ and $R^{35}$ are independently selected from linear, branched-chain or cyclic $C_{1-10}$ alkyl groups, the aryl groups are selected from $C_{6-14}$ aryl groups, the alkenyl groups are selected from mono-or polyunsaturated linear, branched-chain or cyclic $C_{2-10}$ alkenyl groups, and the heteroaryl groups are selected from $C_{6-14}$ heteroaryl groups;

and/or at least two of $R^{33}$, $R^{34}$ and $R^{35}$ form a carbocyclic ring that is a $C_{4-10}$ cycloalkyl group, or a $C_{6-14}$ aryl group, which may be substituted with one or more functional groups; and Ar are selected from $C_{6-14}$ aryl groups, and the heteroaryl groups are selected from $C_{6-14}$ heteroaryl groups, wherein all of the groups mentioned above may be substituted with functional groups; and the functional groups are selected from alkyl (—$R^{11}$), especially $C_{1-6}$ alkyl groups, $C_{6-10}$ aryl (—$R^{12}$), halogen (—Hal), hydroxy (—OH), cyano (—CN), alkoxy (—$OR^3$), amino (—$NR^{112}$, —$NHR^{11}$, —$NH^2$), mercapto (—SH, —$SR^{11}$), wherein $R^{11}$, independently of further $R^{11}$ residues, is selected from $C_{1-6}$ alkyl residues.

16. The process according to claim 14, wherein X is selected from the group of halogen, tosylate, nosylate and mesylate.

17. The process according to claim 14, wherein X is selected from the group of fluorine, chlorine, bromine, iodine, tosylate, nosylate and mesylate, and/or aryl is selected from phenyl, m-tolyl, p-tolyl, o-tolyl, mesityl, 1,3-diisopropylphenyl.

* * * * *